Sept. 17, 1940.  U. EICHLER  2,215,263

MOTOR DRIVEN CALCULATING MACHINE

Filed Dec. 28, 1936  13 Sheets-Sheet 1

Inventor
U. Eichler
By C. F. Wenderoth
Attorney

Sept. 17, 1940. U. EICHLER 2,215,263
MOTOR DRIVEN CALCULATING MACHINE
Filed Dec. 28, 1936 13 Sheets-Sheet 2

Fig. 1a

Inventor
U. Eichler
By C. F. Wenderoth
Attorney

Sept. 17, 1940.   U. EICHLER   2,215,263
MOTOR DRIVEN CALCULATING MACHINE
Filed Dec. 28, 1936   13 Sheets-Sheet 3
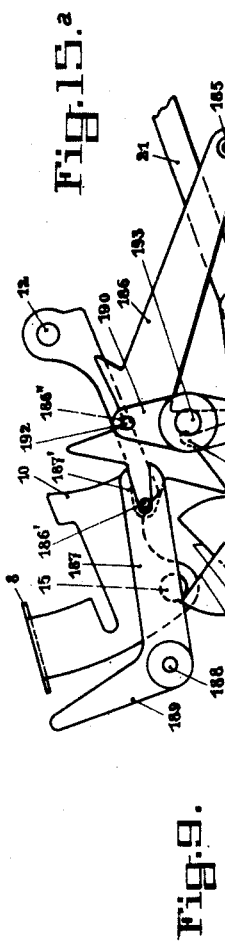
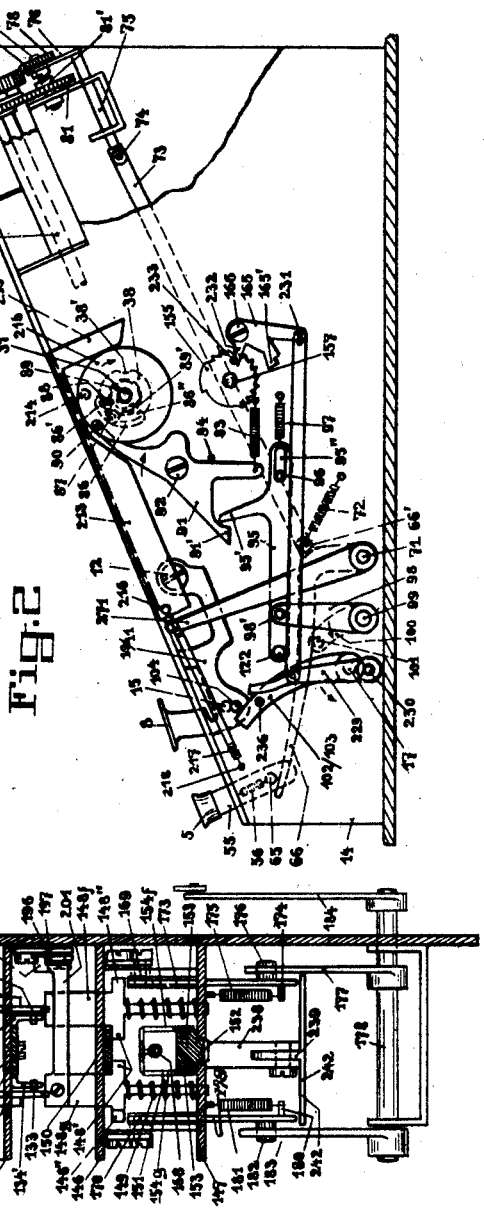
Inventor
U. Eichler
By C. F. Wenderoth
Attorney Sept. 17, 1940.    U. EICHLER    2,215,263
MOTOR DRIVEN CALCULATING MACHINE
Filed Dec. 28, 1936    13 Sheets-Sheet 5
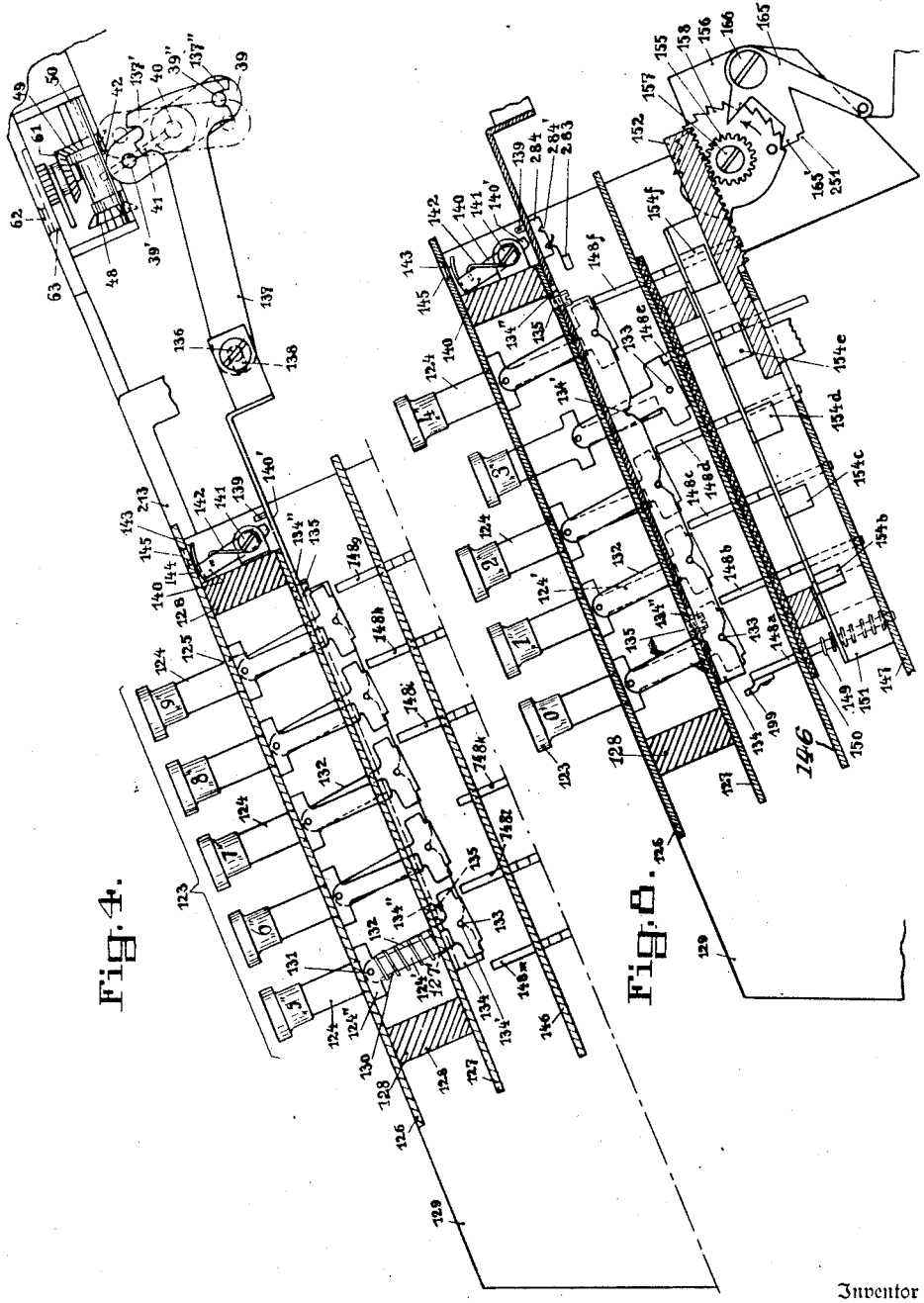
Inventor
U. Eichler
By E. F. Wenderoth
Attorney

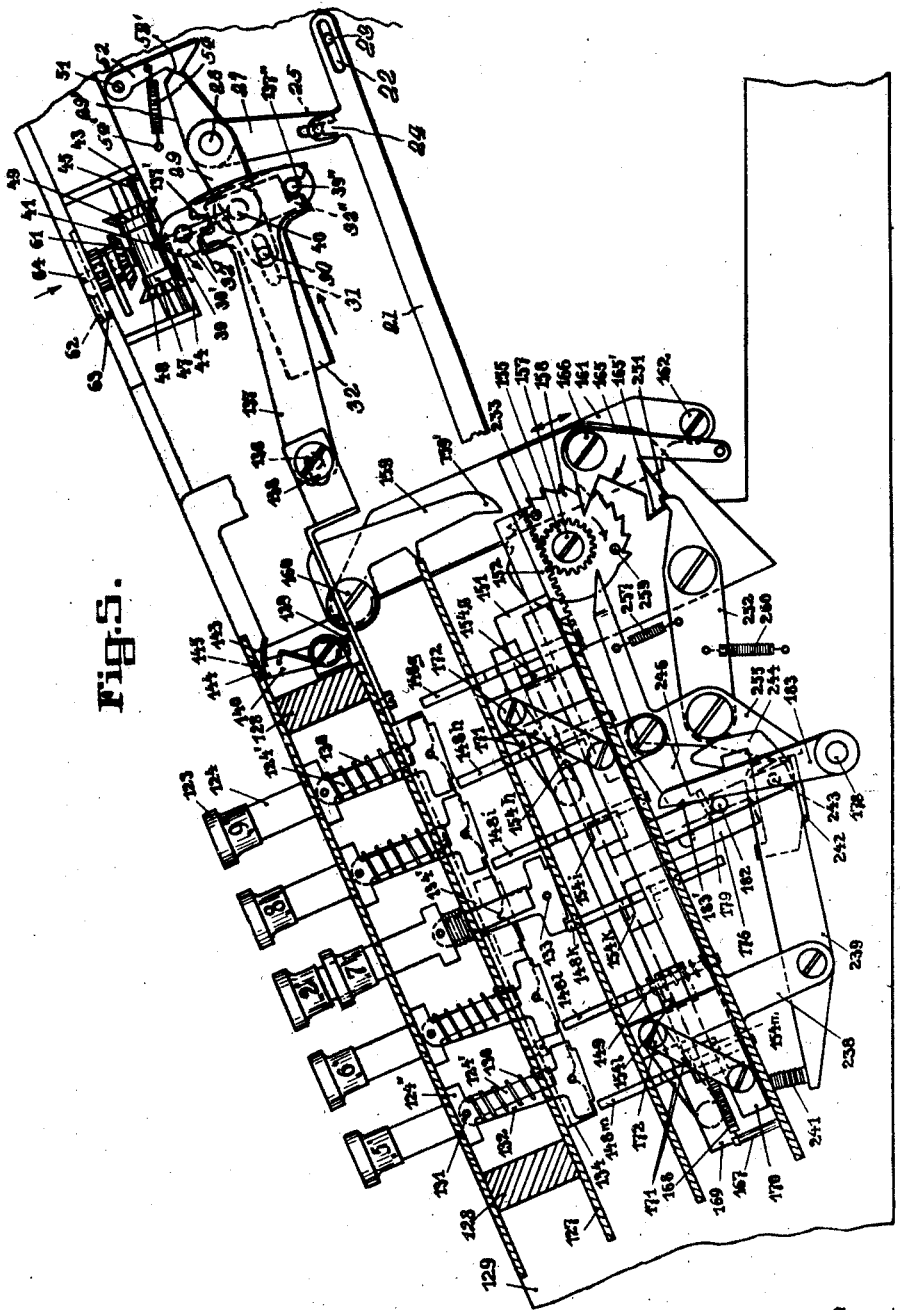

Sept. 17, 1940.  U. EICHLER  2,215,263
MOTOR DRIVEN CALCULATING MACHINE
Filed Dec. 28, 1936  13 Sheets-Sheet 7
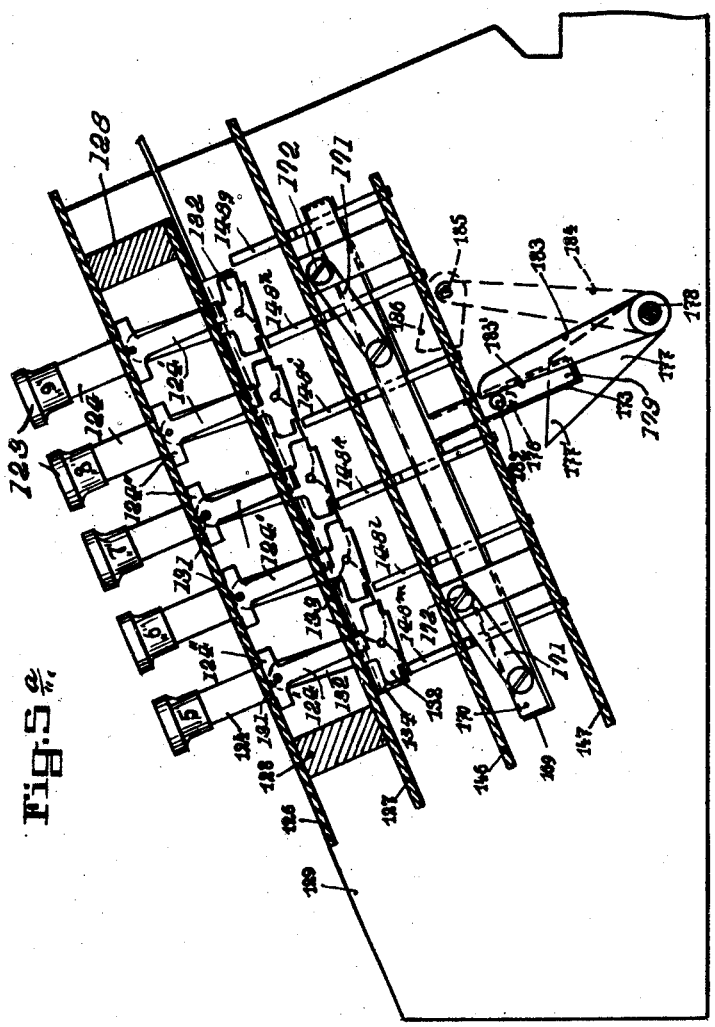
Inventor
U. Eichler
By C. F. Wenderoth
Attorney Sept. 17, 1940.  U. EICHLER  2,215,263
MOTOR DRIVEN CALCULATING MACHINE
Filed Dec. 28, 1936   13 Sheets-Sheet 8

Inventor
U. Eichler
By C. F. Wenderoth
Atty

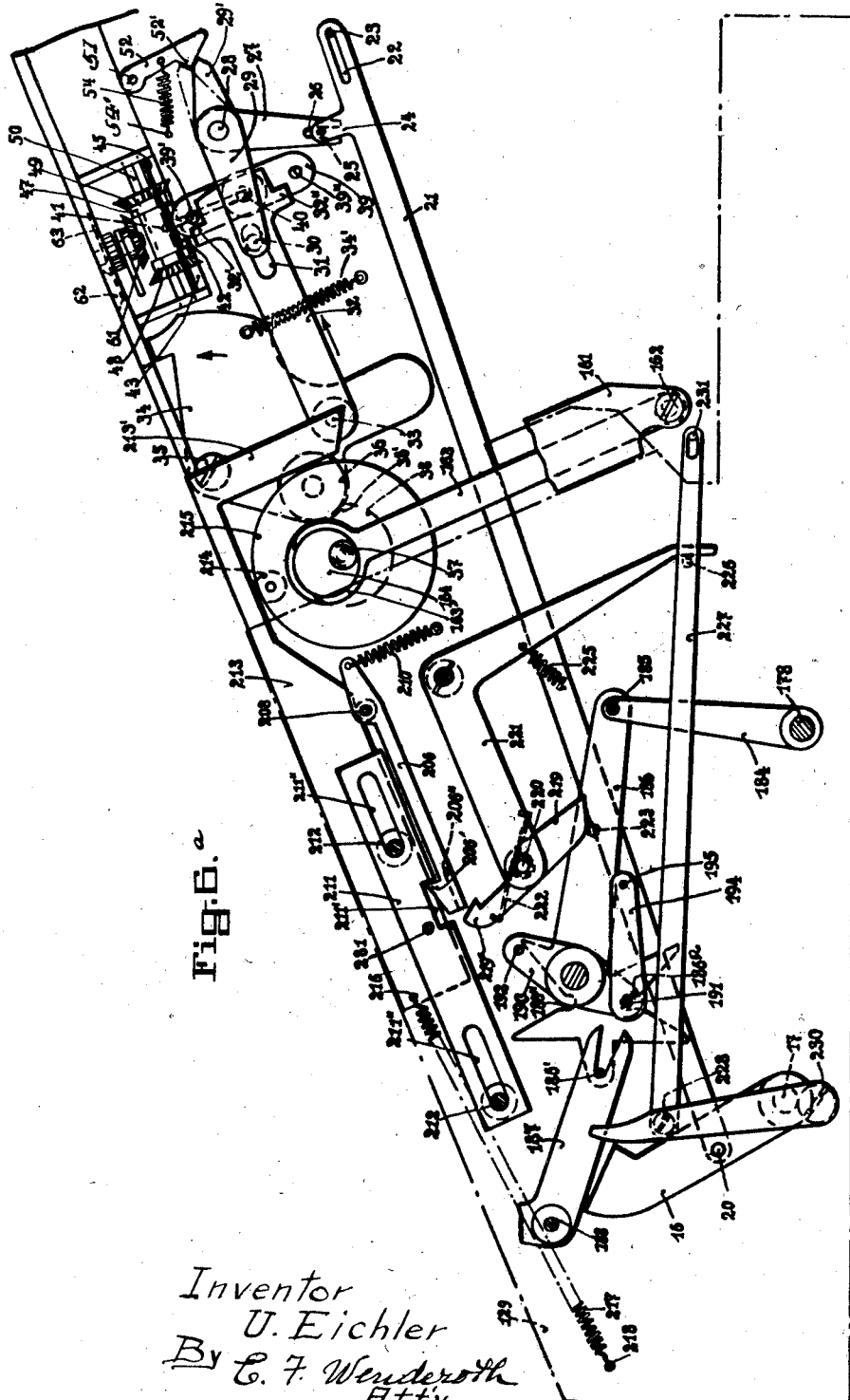

Sept. 17, 1940.                 U. EICHLER                    2,215,263
                    MOTOR DRIVEN CALCULATING MACHINE
                    Filed Dec. 28, 1936        13 Sheets-Sheet 10

Fig. 7.

Inventor
U. Eichler
By
C. F. Wenderoth
Attorney

Sept. 17, 1940. U. EICHLER 2,215,263
MOTOR DRIVEN CALCULATING MACHINE
Filed Dec. 28, 1936 13 Sheets-Sheet 11
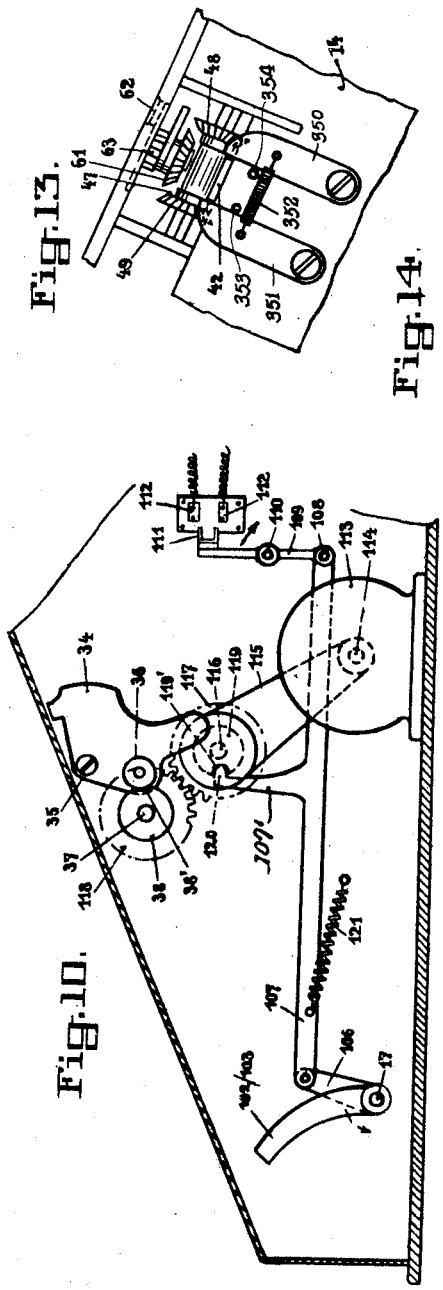
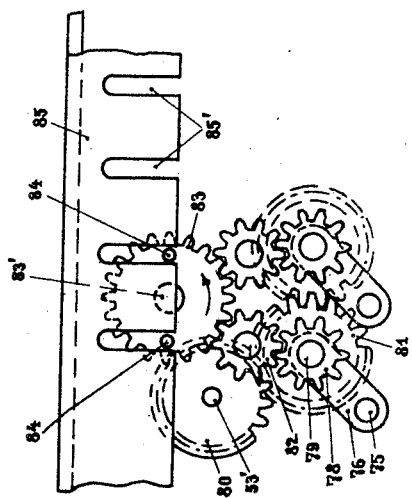
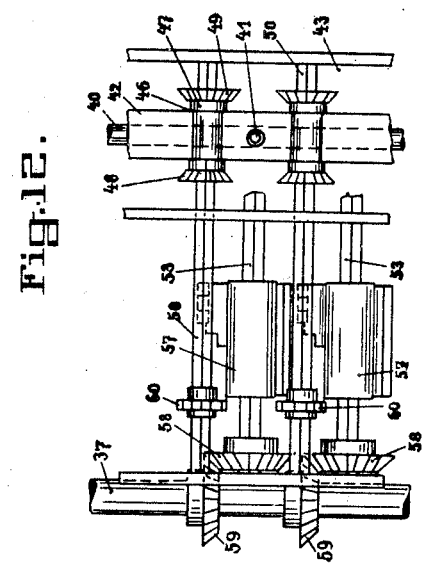
Inventor
U. Eichler
By E. F. Wenderoth
Attorney

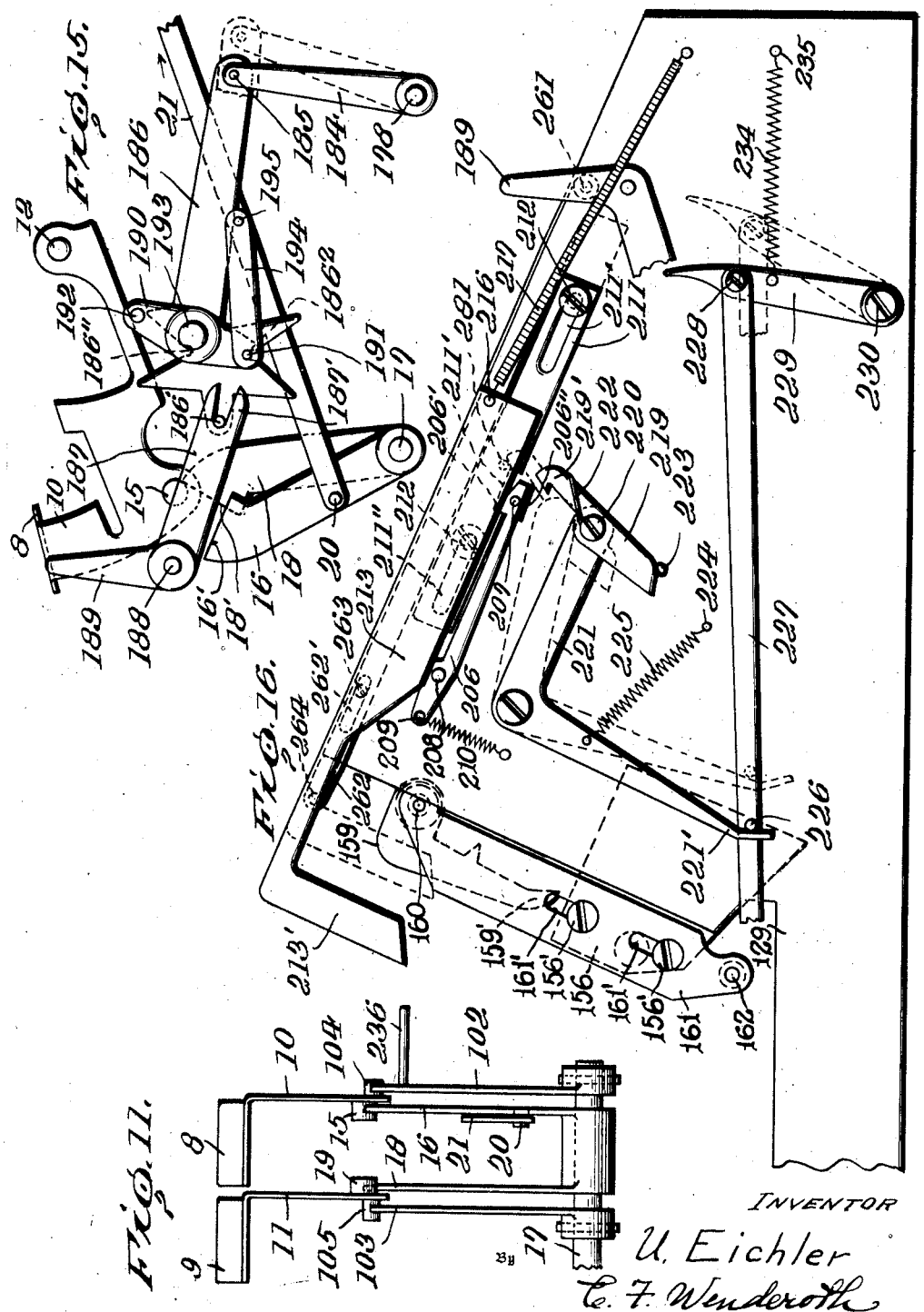

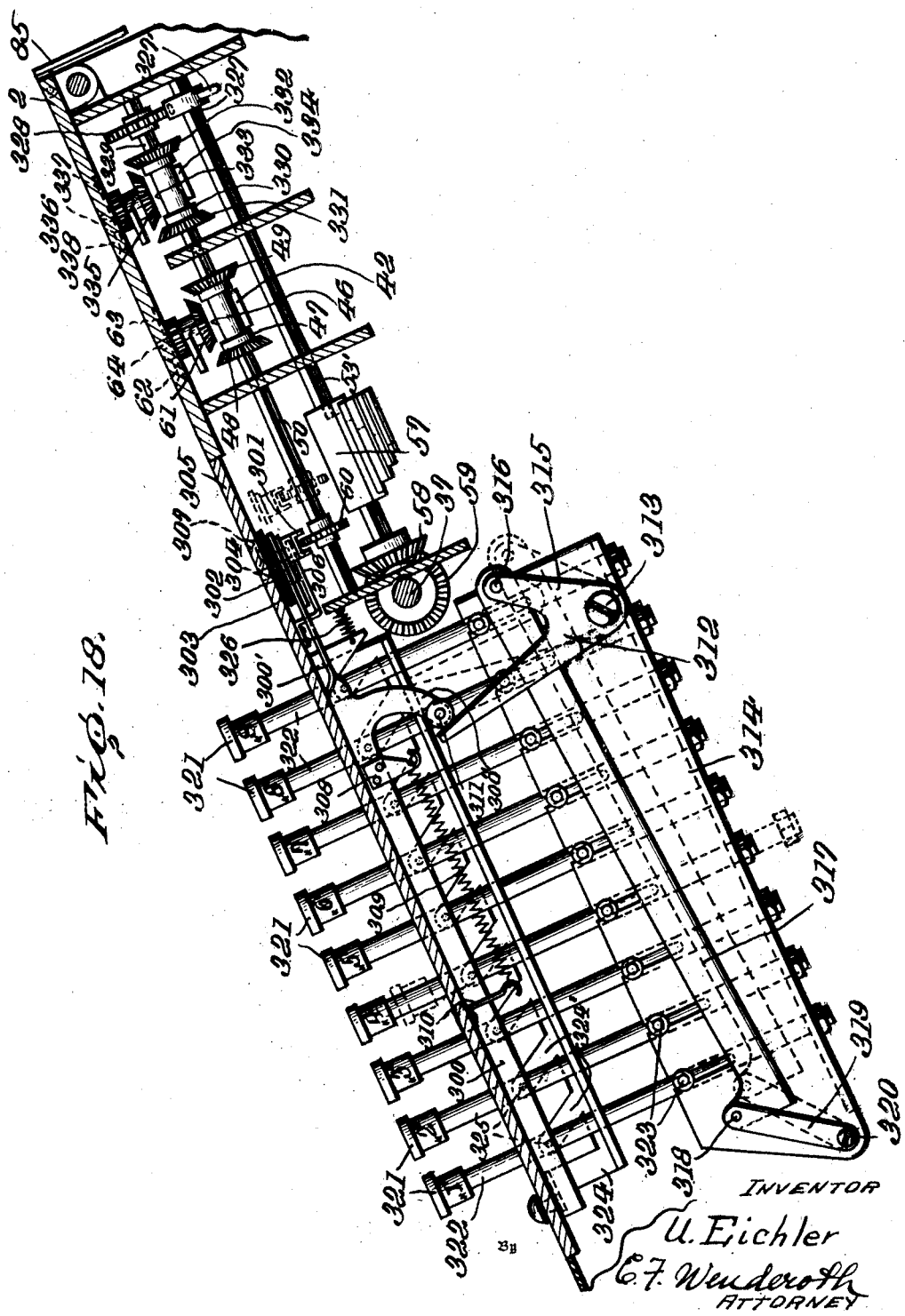

UNITED STATES PATENT OFFICE 2,215,263

MOTOR DRIVEN CALCULATING MACHINE

Ulrich Eichler, Glashutte, Germany

Application December 28, 1936, Serial No. 117,952
In Germany April 5, 1935

18 Claims. (Cl. 235—75)

The invention relates to a motor driven calculating machine in which a multiplier key row comprising keys bearing the indicia "0"-"9" is provided and wherein, on depressing the keys corresponding to the indicia "5"-"9", a setting mechanism is coupled with the drive, which carries out a short-cut multiplication. Previous devices are defective in that the calculating machine carriage must be preliminarily set according to the number of digits in the multiplier, whereupon the multiplier is then set up, beginning with the digit at the left.

The object of the invention is to eliminate this preliminary setting of the carriage and to begin the calculation when the carriage is in its initial, thus its extreme left, position.

An object of the invention is to coordinate with each multiplier key two setting plates, the first of which actuates the multiplying mechanism in accordance with the key value of the multiplier key depressed while the second actuates the multiplying mechanism in accordance with the key value of the key depressed increased by the value 1.

A further object of the invention is to provide means for actuating said setting plates dependent upon the immediately preceding multiplying operation. For instance, if a multiplier key "0"-"4" was involved in the preceding operation, which operated the machine additively in normal manner, then one setting plate is actuated in the succeeding operation, while if a multiplier key "5"-"9" was actuated in the preceding operation which operated the machine subtractively or with short-cut multiplication, then the other plate is actuated in the succeeding operation.

An object of the invention therefore is to provide means for eliminating any special setting of the carriage during a calculation.

A further object of the invention is to provide means for operating with short-cut multiplication so as to secure calculations with an average of fewer main shaft revolutions.

In order to have the multiplier keys in the smallest possible field the multiplying keys are preferably disposed in two adjacent rows, one containing keys having values "0"-"4" and the other keys having the values "5"-"9". Two rows of six setting plates are disposed below the keys.

Further details are explained with reference to the exemplary embodiment shown on the drawings.

Fig. 1a is a plan view with a keyboard, carriage and cover plates removed.

Fig. 2 is a cross sectional view taken on the section line II—II of Fig. 1a looking in the direction of the arrow, with parts omitted for greater clarity.

Fig. 4 is a cross sectional view similar to Fig. 3 showing the levers pivoted to the multiplier keys after an operation involving subtractive or short-cut multiplication.

Fig. 5 is a cross sectional view similar to Fig. 3, with the "7" multiplier key depressed, showing the levers pivoted to the multiplier keys after an operation involving additive multiplication.

Fig. 5a is a view similar to Fig. 5 illustrating the lever 183 in another position.

Fig. 6 is a cross sectional view taken on the section line III—III of Fig. 1 with parts omitted for greater clarity looking in the direction of the arrow $x$ in Fig. 1a.

Fig. 6a is a cross sectional view taken on the section line II—II of Fig. 1a with parts omitted for greater clarity.

Fig. 7 is a vertical cross sectional view taken on section line VII—VII of Fig. 1.

Fig. 8 shows a view similar to Fig. 7 with the parts in a different position.

Fig. 9 is a cross sectional view taken on the section line IX—IX of Fig. 3 and looking in the direction of the arrows.

Fig. 10 is a cross sectional view taken on the section line X—X of Fig. 1a with the wall 14 removed, showing the drive control with certain portions omitted for greater clarity.

Fig. 11 is a detailed view looking from the left of Figure 2 and illustrating particularly the elements coacting with the addition and subtraction keys.

Fig. 12 is a partial plan view of Fig. 18 with the cover plate and carriage removed.

Fig. 13 is a cross sectional view taken on the section line XIII—XIII of Fig. 1.

Fig. 14 is a partial rear elevational view of a portion of the carriage shifting mechanism looking in the direction of the arrow $z$ in Fig. 1a.

Fig. 15 is an elevational view of certain elements of the reversing mechanism in one position.

Fig. 15a is a similar view to Fig. 15 with the elements in another position.

Fig. 16 is an elevational view of portions of the controlling means for the carriage shifting mechanism.

Fig. 17 is an elevational view of the setting bar 151 shown in cross section in Fig. 9 illustrating the formation of the recesses therein which cooperate with the setting plates.

Fig. 18 is a partial vertical cross sectional view taken on the section line XVIII—XVIII of Fig. 1.

Figure 1:
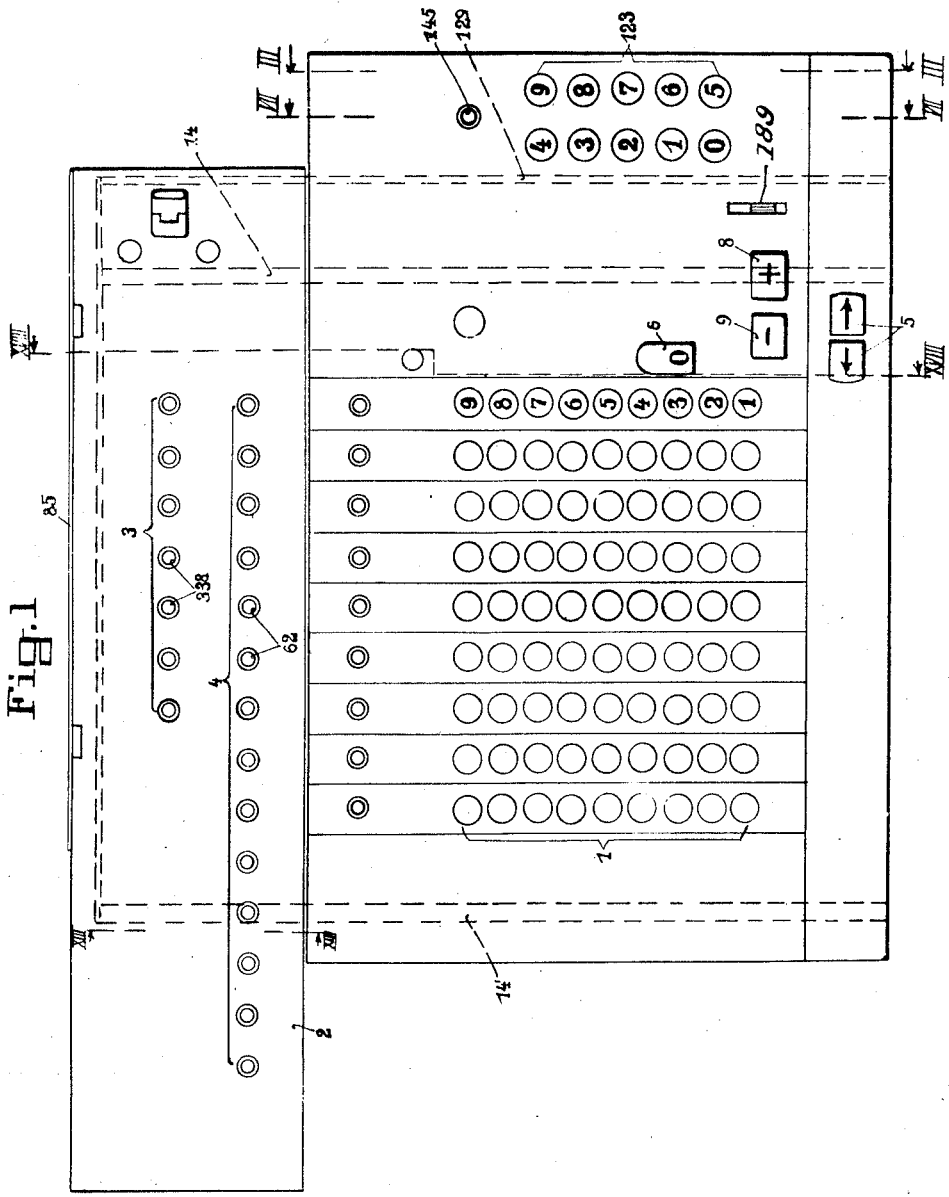
Fig. 1 is a plan view.

1 designates a keyboard which serves for setting up the multiplicand in multiplication calculation. The carriage 2 disposed slidably on the machine frame carries the revolutions counter 3 and the totalizer 4. 5 designates the two carriage shift keys. The clear key is designated by 6. The addition key is designated by 8 and the subtraction key by 9. The operation of the drive actuated by the two last-named keys deserves special consideration with respect to the present invention.

*Plus and minus keys*

As shown on Fig. 2, the keys 8, 9 are mounted on the parallel, adjacent key levers 10, 11. These latter are journalled oscillatably on the lateral wall 14 of the machine frame and are subject to the action of springs (not shown) which retain the keys in the position shown on Fig. 2. Attached to key lever 10 is a pin 15 (Figs. 11, 15 and 15a) which extends into the plane of a lever 16. Lever 16 is journalled rotatably on the shaft 17. Freely rotatable on shaft 17 is a lever 18 which is connected with lever 16 and in the movement path of which a pin 19 attached to key lever 11 extends. Levers 16 and 18 are provided with surfaces 16' and 18' respectively with which pins 15 and 19 contact on depression of the corresponding keys, and thereby rock the levers. According to the position of lever 16 shown on Fig. 6a this is the one assumed by the levers after depressing the plus key 8. If the minus key 9 were pressed the levers 16, 18 would be swung clockwise by the pin 19 striking against the surface 18'. The levers 16, 18 would remain in this position until shifted back by depression of the plus key.

A bar 21 is pivoted by means of a pin 20 to lever 16 (Fig. 6a) and the bar 21 has an elongated recess 22 in which engages a pin 23 on the frame wall 14. Attached to an upwardly extending extension 24 of bar 21 is a pin 25, over which the forked end 26 of a lever 27 engages. Lever 27 is pivotally mounted on a shaft 28 which is journalled in the wall 14. Attached to the outwardly extending end of shaft 28 is a lever 29 which, by means of a pin 30 provided at its end, engages in a slot-shaped recess 31 of a lever 32. Lever 32 is pivoted at 33 to plate 34 which, by means of a screw bolt 35, is journalled oscillatably on the frame wall 14. A roller 36 is journalled on plate 34 and cooperates with a cam disc 38 mounted on the main calculating shaft 37. The cam disc 38 is formed substantially concentric and circular and is provided with an arcuate recess 38', in which the roller 36 lies when shaft 37 is at rest. When shaft 37 is actuated the plate 34 is swung out in the direction of the arrow shown in Fig. 6a by the cam disc 38 against the traction of spring 34'. Lever 32 will then move in the direction of the arrow in Fig. 6a.

Lever 32 is provided with two shoulders 32' and 32", one or the other of which contacts with a pin 39' or 39" according to the position into which lever 32 is swung by the elements 21—30. The pins 39', 39" are on a plate 39 which is disposed on a rocking shaft 40. The latter shaft 40 is journalled in the two frame walls 14, 14' and provided with upwardly extending pins 41 (Figs. 1a and 6a) which engage in corresponding bores of a bar 42.

Bar 42 is slidable transversely to its length in the slots 43 (Fig. 6a), which are formed, on the one hand, by the suitably machined edges 44 of the lateral walls 14, 14', and on the other by sheet metal bars 45. Bar 42 engages (Fig. 12) in grooves 46 of the mountings 47 which at each side carry the transmission bevel gears 48, 49 and which are mounted longitudinally slidable but non-rotatable on the preferably square shafts 50.

An extension 29' with a wedge-shaped end is attached to lever 29 so that the elements 21—29 (Fig. 6a) always pass reliably into one of its end positions and remains there until reversed. Co-ordinated with the extension 29' is a lever 52 journalled at 51 in the machine frame and which is also provided with a wedge-shaped shoulder 52'. This lever is subject to the action of a traction spring 54 attached at 54' to the machine frame. If elements 21—29 are moved from the one into the other end position the extension 29' forces lever 52 back against the traction of spring 54, whereupon extension 29' springs to the other side of shoulder 52'.

*Actuating mechanism*

Coordinated with each shaft 50, see Fig. 18, is a parallel shaft 53, on each of which is mounted the usual actuator cylinder 57 and a bevel gear 58. Bevel gears 58 are driven by bevel gears 59 mounted on the main shaft 37. Gears 60, disposed axially slidable but non-rotatable on shafts 50, cooperate with the actuator cylinders 57, the position of said gears 60 depending on the depressed keys of the corresponding key bank.

*Differential setting mechanism*

The gear 60, provided with ten teeth, is set by means of a bar 300 (see Fig. 18) longitudinally slidable on the keyboard frame, and the right end of the bar 300 is provided with a fork 301 which engages over the wheels 60. The end 300' of bar 300 is turned longitudinally for 90° and is provided with a rack which engages with a gear 302. Gear 302 is connected with a number wheel 303 on a shaft 304, which is journalled, on the one hand, in the cover plate 305 of the keyboard, and on the other, in a bracket 306 connected with the cover plate.

An inspection window (see Fig. 1) is co-ordinated with each number wheel 303. A hook 308 is secured to bar 300, and serves for the attachment of a traction spring 309, which is attached at the other end to plate 305 by means of the hook 310. Spring 309 imparts to bar 300 the tendency to move to the left, with respect to Fig. 18. Roller 311, journalled on the member 300" of bar 300 bears against the end of a lever 312 which, through screw bolt 313, is journalled on the frame 314 of the keyboard.

Integral with lever 312 is a lever arm 315 to the end of which a bar 317 is pivoted by means of a pin 316. The bar is connected on the other hand, through pivot pin 318, with a lever 319 which is journalled at 320 in the frame 314 of the keyboard.

The keys 321 forming the keyboard 1 are each on a key rod 322 which is vertically slidable in the keyboard frame. Journalled to each key rod is a roller 323 which extends into the range of the bar 317. It is also to be noted that each key rod 322 is subject to the action of a spring not shown on the drawing and having the tendency to retain the key bars in the position shown on Fig. 18.

Disposed on the keyboard frame slidably is a control bar 324 provided with recesses 324'. Pins 325 provided on the key rods 322 cooperate with these recesses. On depressing any key, bar 324 is actuated against the traction of its engaging spring 326 and, when the pin has passed through the recess, springs back to the end position shown on Fig. 18, in which it prevents the key rod 322 from returning until the end of the calculation. A device not shown on the drawing moves back bar 324 against the action of spring 326 in the direction of the arrow to release the pin 325. Bar 324 can be returned by means of a lever rod not shown connected with clear key 6.

On depressing one of the keys 321 the corresponding roller 323 strikes against bar 317, whereby the parts 317, 315, 319 describe a pivotal movement, the travel of which depends on the key depressed. For example, if the key 321 bearing "4" is depressed (see dotted position on Fig. 18) the members 315, 317, 319 are carried into the position shown in dotted lines on Fig. 18. Lever arm 312 then moves the bar 300 against the traction of spring 309 to the right so that the co-ordinated gear 60 (see dotted position of Fig. 18) is set in a position to coact with that portion of the actuator cylinder 57 which has four teeth. At the same time the number wheel 303 is moved by the teeth in the end 300' so that a "4" appears in the corresponding window 307. When the main calculating shaft 37 makes a complete revolution, the shaft 53 will also make a complete revolution. However, the shaft 50 carrying the gear 60 corresponding to the actuator cylinder 57 involved, is rotated for $\frac{4}{10}$ of a revolution.

According to the position of the coordinated bevel gear mounting 47, either bevel gear 49 or bevel gear 48 meshes with the corresponding bevel gear 61 (Fig. 5). Coordinated with each totalizer window provided in the carriage 2 is a number wheel 63 attached on the shaft 64. The latter is journalled in the carriage 2.

Accordingly as the bevel gear 49 or 48 engages with bevel gear 61 the number wheel is rotated in the positive or negative direction. That is, on rotation of the corresponding shaft 50 for $\frac{4}{10}$ revolution the number wheel, for example at the start of the operation on "2" is either turned forwardly to "6" or backwardly to "8".

Revolutions counter

It is to be noted that a revolutions counter actuating gear 327, carrying a tooth 327', is attached in known manner to the end of the shaft 53. The tooth cooperates with a ten tooth gear 328 mounted on a shaft 329. The shafts 329 are each journalled axially of shaft 50 in the machine frame. Each shaft 329 carries a bevel gear mounting 330 provided with the bevel gears 331 and 332. Each mounting is provided with a groove 333 in which there is engaged a bar 334 extending transversely through the machine, which corresponds substantially to bar 42 and is subject to similar control. Accordingly as the mountings 330 are moved by bar 334 to the right or left, with respect to Fig. 18, bevel gears 331 or 332 mesh with bevel gears 335. The latter are mounted rotatably on shafts 336 attached to carriage 2 and are each connected with a number wheel. Coordinated with number wheels 337 are the windows 338 which show the revolutions counter on Fig. 1, designated by 3.

Carriage shifting mechanism

The carriage 2 is actuated by the keys designated by 5 in the direction shown by the arrows on the keys. Inasmuch as in multiplying, of greatest interest here, the carriage after calculating each individual decimal order of the multiplier, is shifted to the right, in the following only the function of the right shift key 5, at the right of Fig. 1 will be explained, that is, that part which controls the right shift of the carriage.

This key 5 is mounted on a rod 55 slidable in the machine frame and with which a traction spring 56 engages, which tends to retain the rod 55 in the position shown on Fig. 2. Rod 55 is provided with a pin 65 which extends into the movement plane of the end of an angularly bent lever 66. Lever 66 is attached to a shaft 71 journalled in the frame wall 14, and attached to lever 66 is a traction spring 72 having its other end attached to the machine frame and this spring tends to retain the lever in the position shown in Fig. 2. Connected to lever 66, at 66', is a rod 73, which is pivoted at the other end, at 74, to a rod 75 journalled axially slidable in the machine frame. Attached to rod 75 is a plate 76 which engages in a groove of a clutch connection 77 provided on a gear 78. Gear 78 is axially slidable and freely rotatable on a pin 79 attached to the machine frame.

Gear 78 is driven from main shaft 37. For this purpose the shaft 53, furthest to the right with respect to Fig. 1, is extended by the shaft portion 53', at the end of which a gear 80 is attached, which meshes with a gear 81 (Fig. 2). Gear 81 is journalled on pin 79 and provided with a clutch connection 81' cooperating with clutch connection 77. The clutch connections 81' and 77 are carried into the coupling position by a movement of gear 78 on pin 79, so that the gears 81, 78 are positively rotated together. Gear 78 is in constant mesh with an intermediate gear 82 rotatably journalled in the machine frame (Figs. 2, 14) which gear 82 is connected, on the other hand, with a gear 83. Gear 83 is journalled on the machine frame at 83' and provided with two pins 84. The latter extend in the plane of a flap 85 attached to carriage 2 and provided with slot-like recesses 85'. The pins 84 cooperate with these slot-like recesses 85'. The transmission ratio of the gears 80—83 is such that at each revolution of main shaft 37 and/or shaft 53 (assuming, of course, that gear 78 is in the coupling position) gear 83 describes a half revolution, which, with respect to carriage 2, denotes an advance for a decimal position.

Accumulator disengaging mechanism

Inasmuch as the actuator cylinder shafts 53 rotate simultaneously with the main shaft 37, measures must be provided to prevent transmission of the rotation of the calculating mechanism to the calculating apparatus disposed in the carriage. In the exemplary embodiment illustrated this is done by connecting the cam disc 38 (Fig. 2) detachably with the drive shaft 37 by means of a coupling member. The latter consists of a pawl 86 which is pivoted by means of a pivot pin 87 to the disc 38 eccentrically. By means of a pressure spring 88 engaging an extension 86' of pawl 86 the shoulder 86'' on pawl 86 is forced in front of the projection 89' of a wheel 89 fast on shaft 37. Provided within the range of the extension 86' is a roller 90 which is journalled on the projecting arm of a plate 91. Plate 91 is oscillatably mounted on a screw bolt 92 provided on the machine frame and is drawn by a spring 93 engaging therewith against a stop 94. Plate 91 also carries a projection 91' into the range of which an extension 95' on bar 95 extends. Bar 95 engages by a longitudinal slot 95" a pin 96 attached to the frame. At the right end, with respect to Fig. 2, a traction spring 97 attached at the other side of the machine frame engages bar 95. Bar 95 is journalled at the other side to a lever 98 by means of a pivot pin 98'. Lever 98 is oscillatably mounted on the pin 99 provided on the machine frame. Another lever 100 is connected with lever 98 and its end is provided with a pin 101 which takes a position under lever 66.

If lever 66 is depressed by the carriage shift key 5 the two levers 98, 100 are simultaneously rocked in the direction of the arrow on Fig. 2. Bar 95 is thereby also moved to the left against the action of spring 97 which, in turn, causes extension 95' to strike against shoulder 91', whereby plate 91 describes a rocking movement in the direction of the arrow. Roller 90 is thereby applied against extension 86' and the pawl 86 is swung out so that its shoulder 86" passes out of the range of shoulder 89'.

Thus, while the coupling 77, 81' is closed by pressing key 5, on the other hand the cam disc 38 is disconnected from the drive shaft. The cam disc 38 (Fig. 6a) is inoperative while drive shaft 37 rotates, so that plate 34 and the shoulder lever pivoted thereto is not rocked or moved. The gear mountings 47 thus remain in their neutral central position, so that none of the gears 48, 49 provided thereon mesh with the coordinated bevel gears 61.

The gear mountings 47, as shown in Fig. 13, are normally maintained in their neutral central position, by levers 350 and 351, pivoted to the lateral walls, and cooperating with the bar 42. A spring 352 is connected at its ends to the levers 350 and 351 and normally holds the levers against the stop pins 353 and 354 provided on the lateral walls. Generally two sets of levers 350 and 351 and cooperating parts are provided.

Drive mechanism

The simultaneous operation of the drive motor and the drive shaft 37 takes place when one of the carriage shift keys 5, the addition key 8 or the subtraction key 9, is pressed, through the shaft 17 (Fig. 1a). The two levers 102 and 103, Fig. 11, are attached to this shaft 17. A pin 104 provided on the key lever 10 extends into the range of lever 102, and a pin 105 provided on key lever 11 extends into the range of lever 103. If one of the keys 8 or 9 is pressed the coordinated lever 102 or 103 and therewith the shaft 17 is rocked in the direction of the arrow on Fig. 2.

Also attached to shaft 17 is a lever 106 (Fig. 10) the end of which is connected to a rod 107. Rod 107 is pivoted at the other end, at 108, to a lever 109 which is rotatably attached at 110 to the machine frame. The free end of lever 109 carries an insulated contact bridge 111 which, when lever 109 is rocked in the direction of the arrow shown on Fig. 10 by the said rocking of shaft 17, closes the contact 112 which is interposed in the circuit of the electric motor 113. The drive shaft 114 of the motor is connected by a drive belt 115 with an intermediate shaft 116. Mounted on shaft 116, which is journalled in the machine frame, is a gear 117 which meshes with a gear 118 attached on drive shaft 37.

In order to set the machine in operation, by pressing one of the keys 5, the bar 95 (Fig. 2) is provided with a roller 122 which, when the rod 95 is moved to the left contacts with lever 102 and thereby rocks shaft 17.

In order that main shaft 37, after pressing one of the keys 5, 8 or 9, will describe a complete revolution before the motor is again cut out there is attached on shaft 116 (Fig. 10) a stop disc 119 provided with a recess 119'. Extending into this recess, when the machine is inoperative, is a lug 120 which is attached by means of an extension 107', to rod 107. If, thus, on pressing a key, the rod 107 is moved to the left, with respect to Fig. 10, the stop lug 120 is simultaneously drawn from the notch 119' of disc 119. Inasmuch as shaft 116 begins to rotate at the same time, the lug 120 cannot at once pass back into the recess 119' after release of rod 107. Only when shaft 116 and/or main shaft 37 have described a complete rotation can rod 107, subject to the action of a traction spring 121, again pass back to its initial position, whereby shafts 37 and 116 are brought to a standstill and the current to the motor cut off.

Short-cut multiplication mechanism

Coordinated with the calculating machine are the multiplier keys 123 (Fig. 1) which are arranged in two adjacent rows. Each key 123 is mounted on a slide 124 (Figs. 4 and 8). The upper ends of slides 124 are guided in guide slots 125 provided in a plate 126. The lower tapered ends 124' of the slides 124 are guided in corresponding slots 127' of a plate 127. The lower plate 127 is connected by a connecting member 128 with upper plate 126 which, in turn, is mounted on a vertical frame wall 129. Pressure springs 130 are placed on the tapered ends 124' of slides 124 and tend to apply the extended shoulders 124" on the slide 124 against the lower side of plate 126, thus tending to retain the slides in the initial position.

A substantially T-shaped lever 132 is pivoted to each slide 124 by means of a pivot 131. Each of these T-shaped levers 132 is provided with a pin 133 which extends into a slot-shaped recess 134' of a substantially U-shaped bar 134 (Fig. 9). The bar 134 is thus provided with as many slots 134' as there are levers 132 and/or key slides 124, and the slots 134' are machined in the two vertically, downwardly extending flaps of the bar 134. The bar 134 is guided, longitudinally slidable, on the under side of the plate 127, for which purpose slots 134" are machined (Fig. 8) in bar 134 for the attaching screws 135. A lever 137 is pivoted at the right end of bar 134 (Fig. 4) by means of a pivot pin 136, and its free end is provided with two recesses 137', 137".

Figure 3:
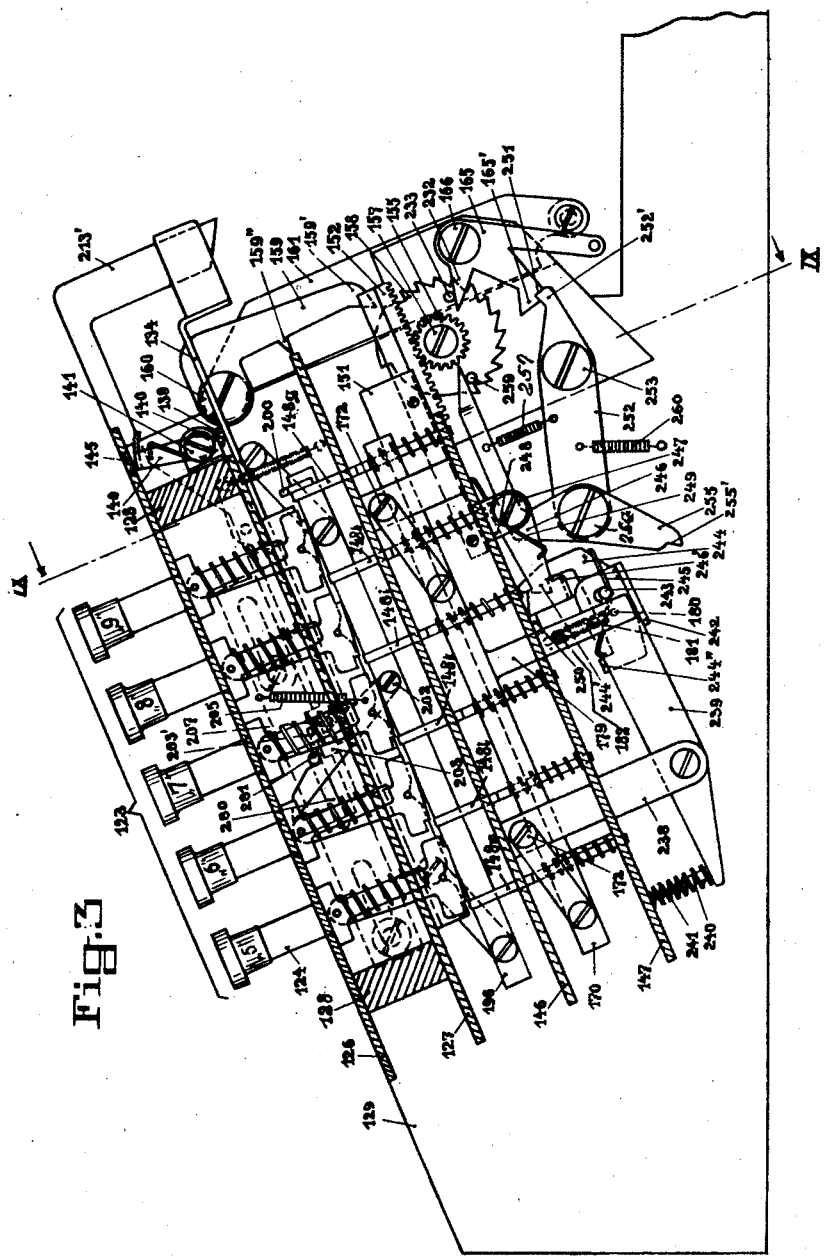
Fig. 3 is a cross sectional view of the multiplier setting mechanism taken on the section line III—III of Fig. 1 on an enlarged scale.

Fig. 4 shows bar 134 in its right end and Fig. 3 in its left end position. These end positions are caused by plate 39, according to whether it is in the position shown by full lines or by dotted lines, in Fig. 4. Pivot pin 136 on lever 137 is guided in an elongated opening 138, so that bar 134 is always moved when plate 39 moves from one into the other end position. When plate 39 merely passes from one end position to the neutral position shown in Fig. 6a no movement is produced as a result of the play of pin 136 in the elongated opening 138.

Plate 134 is provided with an upwardly extending projection or shoulder 139 (Fig. 4) which cooperates with the lower end 140' of a lever 140 journalled at 141. Lever 140 is retained in the position shown in Fig. 4 by a spring 142 engaged therewith. Attached to the free end of lever 140 is a curved plate provided with a red color field 143 and a black color field 144. If lever 140 is in the position shown on Fig. 4 the red mark appears in the window 145 provided in plate 126. If bar 134 is moved to the left, when plate 39 passes into the dotted position of Fig. 4, the shoulder 139 strikes against the end 140' of lever 140 and rocks it against the action of spring 142, and the black mark will appear in window 145.

Disposed on the frame wall 129 (Fig. 8) are two other plates 146 and 147, parallel with plates 126, 127, and which are provided with two rows of slides, corresponding to the double row arrangement of key slides 124, and, in order to distinguish them more clearly, designated by 148a—148m (Fig. 9). These slides, of which there are six in a row, are coordinated with the levers 132 so that the levers assume a position either over the slides at the right thereof (see Figs. 4 and 8), or over the slides at the left (see Fig. 5). Mounted on each slide 148a—148m is a pressure spring 149 which bears against the plate 147 and tends to retain the slides in their initial position, in which the abutments 148' thereon are applied against a bar 150 of fibre or the like provided on the under side of plate 146.

Disposed between the two rows of slides 148a—148m is a U-shaped bar 151 (Figs. 8, 9 and 17) formed as a slide and in the right portion of which a rack 152 is attached by means of the screws 153 (Fig. 9). Both sides of the U-shaped bar 151 are provided with recesses which are graduated with respect to their longitudinal extent in the direction in which the bar moves. The recesses provided at the left side, with respect to Fig. 1, that is, coordinated with slides 148b—148f, are designated by 154b—154f. It is to be noted that no recess is provided on bar 151 for the slide 148a at the extreme left (Fig. 8). In the initial position of the bar 151, shown in Fig. 3, the right edge of slide 148a is flush with the left end of bar 151. The recesses of bar 151 at the right, relative to Fig. 1, coordinated with slides 148g—148m are designated by 154g—154m.

The rack 152 cooperates (Fig. 8) with a gear 155 which is journalled by means of a pin 157 on a frame plate 156 connected with the frame plate 129. Gear 155 is connected with a ratchet wheel 158, with which there is coordinated a pawl 159 (Fig. 3) which is pivoted by means of a pin 160 on a slide 161 on plate 156. The slide 161 is slidably mounted on the plate 156 by means of two screws 156' attached to the plate 156. The screws 156' extend through slots 161' provided in the slide 161 as shown in Fig. 16.

A connecting rod 163 (Fig. 6a) engages by means of a pivot pin 162 at the lower end of slide 161, and at the other end engages with a bearing eyelet 163' over an eccentric disc 164 attached to drive shaft 37. On rotation of shaft 37, slide 161 is vertically reciprocated in the direction of the arrow on Fig. 5, through the connecting rod 163. The nose 159' of paw ll59 thereby contacts with ratchet wheel 158 and shifts it back in the direction of the arrow shown on Fig. 5.

A pawl 165' provided on a rocker plate 165 also cooperates with the ratchet teeth of wheel 158. Plate 165 is rotatably journalled by means of a pin 166 on plate 156. When plate 165 is in the position shown in Fig. 8 pawl 165' snaps into the ratchet teeth and thereby prevents ratchet wheel 158 from turning backward in the direction of the arrow on Fig. 8. The tendency of ratchet wheel 158 to move counter-clockwise is provided by the rack 152 and/or the bar 151, being subject to the action of a traction spring 168 engaging with bar 151 and attached to the machine frame at 167.

The recesses 154b—154m are stepped in the direction in which bar 151 moves so that on actuating slides 148a and 148g no longitudinal movement of the bar 151, due to the traction of spring 168, takes place. The recesses 154b and 154h coordinated with slide 148b and 148h are so large that bar 151 can move to the left through the action of traction spring 168 to such extent that the connected ratchet wheel 158 is rotated for the space of a tooth counter-clockwise. The depressions 154c and 154i are somewhat larger, so that on actuating the coordinated slides 148c and/or 148i, ratchet wheel 158 can rotate for the space of two teeth. Recesses 154d and 154k are again still somewhat larger, so that when the corresponding slide is actuated the ratchet wheel can rotate for the space of three teeth. Recesses 154e and 154l correspond to a rotation of wheel 158 for four teeth, and recesses 154f and 154m, finally, to a rotation for the space of five teeth.

With the exception of the two slides 148a and 148g, the other slides (148b—148f, 148h—148m) each have a shoulder 148'' (Fig. 9). Two bars 169 and 170 are coordinated with these shoulders corresponding to the double row arrangement. Bar 169 is thus coordinated with the slide row 148a—148f, and bar 170 with the row 148g—148m. These bars are each pivoted parallelogram-like on two levers 171 journalled at 172 (Fig. 5).

Attached to the bar 169 is an extension 173 passing through the plate 147 (Figs. 7, 9), with which there is engaged a traction spring 175 which urges bar 169 to the position shown in Fig. 5. The roller 176 (Fig. 9), which extends into the path of movement of a cam lever 177 (Fig. 7) is journalled on the extension 173. Lever 177 is secured to a shaft 178 journalled in the frame wall 129. If bar 169 is depressed by the shoulder 148'' of one of the slides 148b—148f, roller 176 contacts with the cam surface 177' of lever 177 and swings it into the position shown in Fig. 7.

A downward extension 179, engaged by a traction spring 181 at 180, is attached to the bar 170. A roller 182 is journalled on this extension and, when bar 170 is depressed, as a result of actuating one of the corresponding slides 148h—148m, contacts against a cam surface 183' (Fig. 5) of a lever 183, which is also secured on shaft 178.

Another lever 184 (Fig. 6a) is attached to the end of shaft 178 extending through the frame wall 129, and its free end is connected by a pin 185 with a cam plate 186 specially shown on Fig. 15. This cam plate 186 engages by a pin 186' in the forked end 187' of an angle lever 187. The latter is journalled at 188 in wall 129 and is provided with a handle 189 extending through the machine casing.

Coordinated with plate 186 is a double armed lever 190, the two free ends of which are provided with two pins 191 and 192 which extend in the path of movement of plate 186. If lever 187 is in the position shown in Figs. 6a and 15, pin 191 engages in the lower recess 186² of plate 186. By reversing handle 189 into the position shown in Fig. 15a pin 191 is disengaged from recess 186², while on the other hand pin 192 comes into the upper recess 186'' of plate 186. This results in a reversing which will be described in the operation of the machine.

Attached rotatably to the double armed lever 190, which is rotatably journalled in the frame wall at 193, is a link 194 which, at the other end, is connected by pin 195 (Fig. 6a) to the rod 21.

Rod 169 or rod 170 is moved downwardly accordingly as one of the slides 148b—148f or one of the slides 148h—148m is actuated. The result of this, however, is that shaft 178 and/or lever 184 passes either into the left or right end position, with respect to Fig. 6a. Assuming that the plate 186 assumes the position shown on Fig. 6a, rod 21 will assume the right end position.

Disposed between the plates 127 and 146 is another bar 196 (Fig. 7) similar to bars 169 and 170, which is carried parallelogram-like by two levers 197 rotatably journalled at 198. Abutment 199 (Fig. 7) and abutment 200 (Fig. 9) extend above and over this bar 196 in order to actuate the same. Abutment 199 is on slide 148a and abutment 200 is secured to slide 148g by means of a connecting bar 201.

Figures 6, 17:
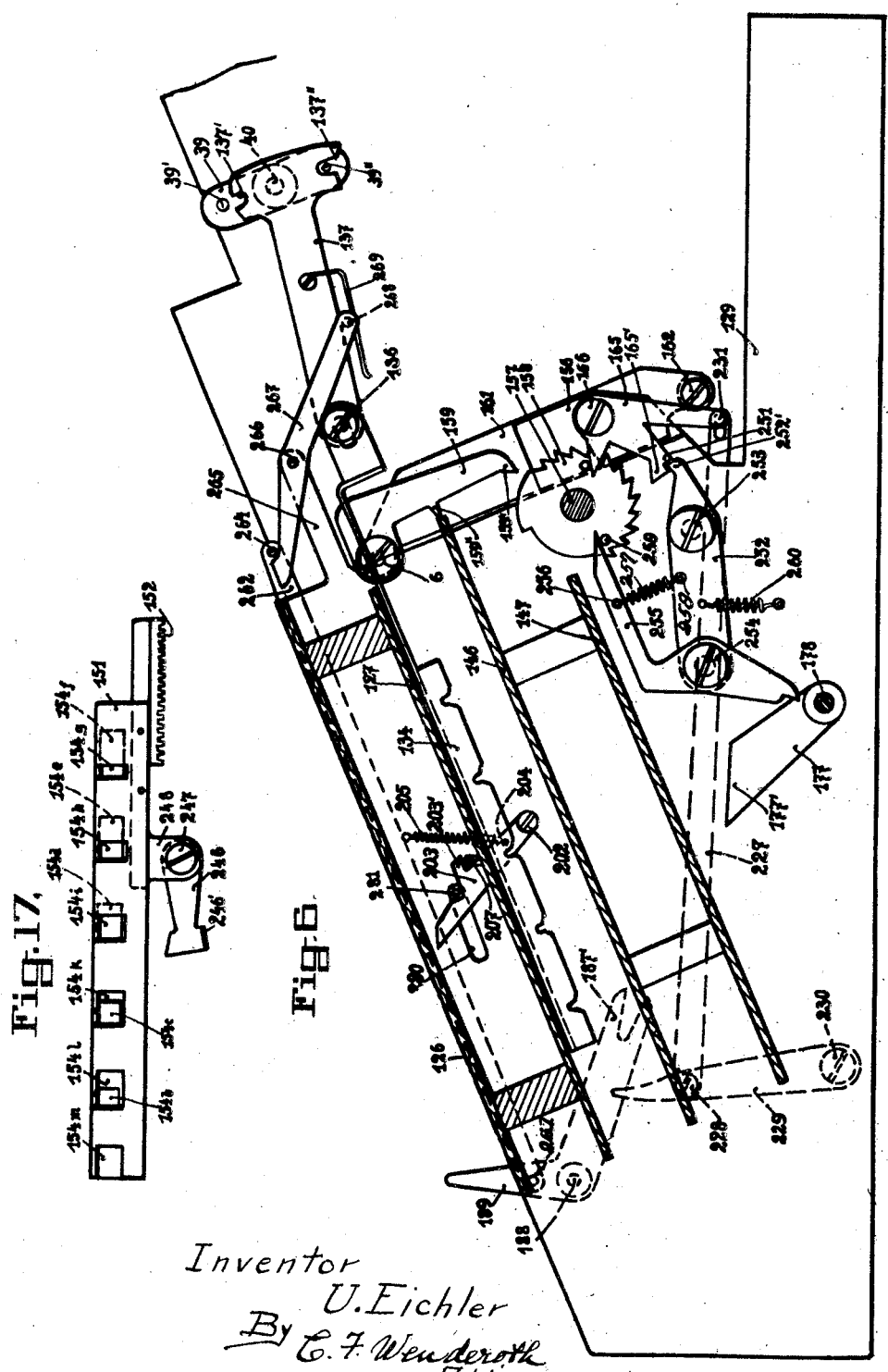

Thus, if slide 148a or 148g is depressed, bar 196 is simultaneously moved downwardly. Pivoted on bar 196 at 202 (Fig. 7) is a pawl 203 with which, at 204, a traction spring 205 attached to plate 129 engages (Fig. 6). This traction spring tends to move the pawl to the position shown in Figs. 3 and 6. The pawl is provided with a projecting shoulder 203' which engages over a pin 207 (Fig. 16) passed through a corresponding slot in the frame wall 129. The pin 207 is attached to a lever 206 which is rotatably journalled at 208 in wall 129. Engaged with the free end of the lever 206, at 209, is a traction spring 210 which tends to apply the pawl-like projection 206' of lever 206 in a recess 211' of a bar 211. Bar 211 is provided with two longitudinal slots 211'' through which engage the attaching screws 212. Connected to this bar 211 formed as a slide is a bar 213 which is provided with a hook-like downwardly extending end 213'.

A roller 214 (Figs. 1a, 2) which is journalled on the flank of a disc 215 attached to drive shaft 37 extends into the moving range of this hook-like end 213'. A pin 216 is attached to the bar 213 (Fig. 16) connected with the slide 211, and a strong traction spring 217 is engaged therewith, the other end thereof being attached to pin 218 on wall 129. This spring imparts to slide 211 and bar 213 the tendency to move to the right relative to Fig. 16 or to the left relative to Fig. 6a. These elements are prevented from describing this movement by the pawl projection 206' engaging in the recess 211'.

Provided on lever 206 (Fig. 16), near the pawl projection 206', is an abutment 206'' projecting from the plane of the lever, and with which the end 219' of a pawl 219 cooperates. Pawl 219 is rotatably journalled at 220 on an end of a lever 221. A spring 222 engaging pawl 219 tends to apply the free end of pawl 219 against a stop pin 223 provided on wall 129. Angle lever 221 is subject to the traction of a spring 225 attached at 224 to 129, so that the free end 221' of the angle lever is applied against a pin 226 attached to a bar 227. Bar 227 is pivoted on the one hand, at 228 to a lever 229, which is oscillatably journalled at 230 on wall 129. At the other end bar 227 is pivoted by means of a pin 231 to the rocking plate 165 (Fig. 6). Plate 165 is provided with a third extension 232 which extends into the movement plane of a pin 233 provided on ratchet wheel 158.

A traction spring 234 (Fig. 16) which is attached at 235 to wall 129 engages with lever 229. This spring imparts to rod 227 the tendency to move to the right as shown in Fig. 16. As the end of rod 227 engages the rocker plate 165 this is given the tendency to move clockwise, according to the arrow on Fig. 5. Lever 229 (Fig. 16), when it can follow the traction of spring 234, acts on a pin 236 (Figs. 2, 11) attached to lever 102.

A double armed lever 239 (Fig. 3) is disposed on the small bearing block 238, below plate 147. One end of lever 239 is provided with a pin 240 on which a pressure spring 241 is mounted which tends to hold the lever in the position shown in Fig. 3. Attached to the other end of the lever is a plate 242 positioned transversely to the direction in which lever 239 moves (Fig. 9). Plate 242 is arranged so as to come into position just below the two ends of the extensions 173 and 179. Pivoted to lever 239 by means of a pivot pin 243 (Fig. 3) is a pawl lever 244, one end of which is provided with a check lug 244' and the other with an abutment 244''. A spring 245 around pin 243 tends to rock lever 244 so that abutment 244'' is applied on the upper edge of lever 239 as shown in Fig. 3. The pawl shoulder 244' cooperates with a lateral extension 246' provided on another pawl 246.

Pawl 246 is journalled by means of a pin 247 on a downwardly extending extension 248 of rack 152 (Fig. 17). In the inoperative or initial position pawl 246, through the action of a spring 249 (Fig. 3), is applied against a stop bar 250 provided on the lower side of plate 147.

Cooperating with a notched recess 251 machined in the rocker plate 165 in the vicinity of the pawl 165' (Fig. 3), is the correspondingly tapered end 252' of a double armed lever 252, which is journalled at 253 in the plate 156. Pivoted to the free end by means of the screw bolt 254 is a substantially angular plate 255. A traction spring 257 has one end attached at 258 to lever 252 and at the other end engages with plate 255 at 256 (Fig. 6). Through the traction of this spring the tapered end of plate 255 is applied against a pin 259 on ratchet wheel 158. Also engaged with lever 252 is a traction spring 260, the other end of which is attached to plate 129 and tends to draw the lever end 252' into the recess 251.

It is also to be noted that a bar 262 is pivoted to handle 189 (Figs. 6, 16) by means of a pin 261, which bar 262, by means of a screw bolt 263 which is passed through a slot 262' of bar 262, is journalled longitudinally slidably on the frame wall 129. Attached to the end of bar 262 is a pin 264 which extends into the movement path of a two armed lever 267 pivoted to a frame extension 265 at 266. The free end of lever 267 is provided with a pin 268 which engages under lever 137. A spring wire 269 attached to lever 137 engages under pin 268, so that lever 137 always follows the position of pin 268. If, in order to reverse the cam plate 186, handle 189 is carried into the position shown in Fig. 15a, bar 262 is at the same time shifted, that is, to the left, according to Fig. 6. Lever 267 is thereby rocked by means of pin 264 so that it carries lever 137 upwardly, the result of which is that pin 39' passes into recess 137'.

The pin 216 (Fig. 2) provided on bar 213 extends into the path of movement of a lever 271, attached to shaft 71.

Operation

The operation of the new machine is explained with reference to the following exemplary calculation: 24×373.

The "4" is first set up on the key board 1 (Fig. 1) of the key bank at the farthest right, and the "2" in the adjacent key bank. The result thereof is that the gear 60 coordinated with the extreme right key bank is moved on its shaft 50 so that it comes into position opposite that part of the actuator cylinder 57 which has four teeth. The gear 60 (Fig. 12) coordinated with the second key bank, on the other hand, is moved on its shaft 50 so that it comes opposite that part of the actuator cylinder 57 which has two teeth.

It is also to be noted that the parts are in the initial position shown on Figs. 3 and 6a. After the multiplicand has been set up in the described manner on the key board the multiplier can be set up by means of the keys 123, beginning with the lowest decimal position, thus with "3", then the "7" and finally the "3" of the highest decimal position is pressed.

Before beginning to set up the multiplier, caution must be observed that the black field 144 appears in the window 145 (Fig. 5). This would be the case according to Fig. 3. In this position the T-shaped lever 132 coordinated with the slide of the key 123 bearing indicia "3" is in a position such that its left end is over the key slide 148d, see Fig. 7. If the red field appears in the opening 145 the key designated by "0" must be depressed and the totalizer and revolutions counter cleared.

If, then, key "3" is pressed (Fig. 7) slide 148d will be depressed and its spring 149 compressed. The projection 148" (Fig. 9) of said slide thereby strikes against bar 169 and moves it downwardly from the starting or initial position into the position shown in Fig. 7. At the same time the extension 173 on bar 169 contacts with plate 242, whereby lever 239 is rocked into the position shown in Fig. 7. In this rocking movement of the lever, shoulder 244' (Fig. 3) of lever 244 has carried pawl 246 downwardly so that the latter is released from the stop bar 250 and bar 151, following the traction of spring 168 (Fig. 7) engaged therewith, can move to the left. Bar 151 can move until the right edge of recess 154d is applied against the projection 148' on the slide 148d. The movement of bar 151 releases the lateral extension 246' from the shoulder 244' of the lever 244.

As stated, recess 154d (Fig. 7) is dimensioned so that ratchet wheel 158 will rotate for three tooth subdivisions from the initial position shown in Fig. 3 in the direction of the arrow in Fig. 7. At the same time, however, on actuating slide 148d as shown in Fig. 7, the roller 176 (Fig. 5) on extension 173 of bar 169 has come in contact with the cam 177' of the lever 177, so that the latter, when slide 148d passes into its lower end position, positively assumes the position shown in Fig. 7. In this position of lever 177, however, the shaft 178 and the lever 184 attached thereto has at the same time passed into the left end position, with respect to Fig. 6a. Through the cam plate 186 and lever 190 as well as the link member 194, rod 21 has thereby also been carried into the position shown on Fig. 6a, insofar as the parts involved have not previously assumed this position.

After shoulder 244' on lever 244 (Fig. 3) has depressed pawl 246 lever 244 takes the position shown in Fig. 7, while pawl 246 (Fig. 3), through the action of spring 249 engaged therewith, is applied against the bottom of the stop bar 250 (Fig. 7). As soon as extension 173 reaches its lowest position, lever 239 also assumes its extreme swung-out position and the corresponding edge of plate 242, through slight rocking of lever 255, passes into a depression 255' at the end of lever 255. When a key 123 is pressed down nothing else takes place than previously described.

If the depressed key 123 is released (Fig. 7) it returns to the initial position through the action of the spring 130 coordinated therewith. At the same time, however, slide 148d cannot at once pass back upwardly, since the upper edge of the projection 148' (Fig. 9) contacts with the upper wall of the U-shaped bar 151 limiting the recess 154d. The upper part, or the central part, of the U-shaped bar is perforated (Fig. 7) only in the range of the entrance of the extension 148'.

The result of this slight upward movement of slide 148d (Fig. 7) is that also the bar 169 and its projection 173 can also ascend for a corresponding extent. This, in turn, results in that lever 239 is rocked slightly upwardly in the direction of the arrow on Fig. 7. On this movement of lever 239 into the intermediate position, however, the downwardly extending end of lever 255 is supported by its recess 255' against plate 242. Thereby, inasmuch as spring 241 is stronger than spring 260, lever 252 is rocked slightly clockwise. In this rocking movement of lever 252 into said intermediate position, however, shoulder 252' of lever 252 releases the rocker plate 165, so that it rotates clockwise due to the traction of the rod 227 (Fig. 6) engaged therewith. The extension 165', acting as a pawl, thereby engages with the teeth of ratchet wheel 158.

The lever 229 connected with rod 227 is thus able to swing through the action of spring 234 into the dotted position of Fig. 16. In this rocking movement lever 229 strikes against the pin 236 on lever 102 (Fig. 11), so that when lever 229 passes into said dotted position of Fig. 16, shaft 17 is swung in the direction of the arrow shown on Fig. 10. Thereby, through the rods 106—110, the contact 112 for the circuit of the drive motor 113 is closed. At the same time lug 120 is also withdrawn from the recess 119' of disc 119, so that the motor, set in operation, drives the intermediate shaft 116 and, through the gears 117 and 118, the main drive shaft 37. In this movement of rod 227 lever 221 is at the same time rocked into the dotted position of Fig. 16 and pawl 219' comes into position opposite projection 206".

While drive shaft 37 describes its first revolution slide 161 is moved once downwardly and upwardly through eccentric 164 (Fig. 6a) and connecting rod 163. Shift pawl 159, journalled on slide 161, is thereby also moved downwardly and back. In the downward movement of slide 161 (see Fig. 7) the projection 159" on pawl 159 is first released, so that the pawl, after projection 159" has passed by the edge of plate 146, can swing somewhat in the direction of the arrow on Fig. 7, whereby the tooth 159' is carried into the range of the teeth of ratchet wheel 158, that is, into the third tooth interstice from the top. During the further downward movement of slide 161 wheel 158 is rotated clockwise for a tooth subdivision. Wheel 158 is retained in this new position by the pawl 165'. During the first revolution of the main shaft, plate 34 and lever 32 (Fig. 6a) enter into operation and the shoulder 32' rocks plate 39 so that the gear mountings are moved to the right with respect to Fig. 6a, and thus gears 48 mesh with gears 61, and the multiplicand is carried positively into the totalizer, so that a "24" appears in totalizer 4.

At the end of the first revolution, inasmuch as lever 229 still acts on pin 236 (Fig. 11) and holds lever 102 and therewith also shaft 17 in the swung position, main drive shaft 37 at once passes into its second revolution, while slide 161 (Fig. 6) again describes a downward and upward movement. Ratchet wheel 158 is thereby again shifted back for a tooth subdivision, while at the end of the second revolution a "48" appears in the totalizer. Inasmuch as at the end of the second revolution of the main shaft, lever 229 is still in the swung position, the rod system 102, 106—110 (Fig. 10) still in the position corresponding to the connection of the electric motor, main shaft 37 at once passes into the third revolution, during which ratchet wheel 158 is again shifted back for a tooth subdivision by pawl 159. Wheel 158 thus comes into the initial position shown in Fig. 3.

At the end of the third revolution of the main shaft the value "72" appears in the totalizer as a result of multiplying the multiplicand "24" by "3". During the last shift movement of ratchet wheel 158 the pin 233 provided thereon strikes against the projection 232 of the rocker plate 165 and moves it back to the initial position shown in Fig. 3, so that the projection 165' is disengaged from the teeth of wheel 158 and shoulder 252' of lever 252 comes into the recess 251 of rocker plate 165 and thereby holds it in the initial position.

At the same time the pin 259 on ratchet wheel 158 has contacted with the tapered end of lever 255 and swung it into the initial position shown in Fig. 3, whereby the recess 255' releases plate 242 (Fig. 7) and lever 239 likewise swings into its initial position shown in Fig. 3.

When ratchet wheel 158 passes into its initial position bar 151 is, in turn, drawn back to such extent that it reaches its initial position shown in Fig. 3. Therefore the slot, through which the extension 148' (Fig. 9) has passed into the recess 154d, is located again over extension 148', so that slide 148d can snap back to the initial position of Fig. 3.

Inasmuch as the entrance slots to the recesses 154b—154m are located in front of the extensions 148' only when bar 151 is in its initial position of Fig. 3, the multiplier keys 123 are restrained until such time.

When rod 227 is moved to the left with respect to Fig 16, at the end of the third revolution of the main shaft, pin 226 again rocks lever 221 back to the position shown in full lines. The pawl extension 219' thereby carires lever 206 downwardly therewith, so that the shoulder 206' is withdrawn from the recess 211' of bar 211. In this manner the two interconnected parts 211, 213 are subjected to the traction of spring 217, so that said parts can snap into the dotted position of Fig. 16.

It is to be noted that pawl 219', after having carried lever 206 downwardly for a while, is swung out by pin 223, against the action of the spring 222 engaged therewith, that the pawl shoulder 219' releases the projection 206', and lever 206 can thus move upwardly through the traction of spring 210.

On movement of the system 211, 213 through the action of spring 217, the pin 216 (Fig. 2) on bar 213, strikes against the end of lever 271 and moves it to the left with respect to Fig. 2. As lever 271 is connected through shaft 71 with lever 66, the rocking of lever 271 by pin 216 produces the same result as if lever 66 were rocked by means of the key 5. Through this rocking of lever 66 gear 78 is moved on its shaft 79 by means of the rod 73, so that the clutch 77, 81' is connected. Through this rocking of lever 66 however, at the same time, by means of the pin 101 engaging under lever 66, the two levers 98, 100 are swung in the direction of the arrow on Fig. 2. Therefore plate 95 is moved to the left with respect to Fig. 2 against the action of spring 97 engaged therewith. The extension 95' contacts with the projection 91' of plate 91, so that the latter is swung in the direction of the arrow on Fig. 2 and roller 90 contacts with the pawl extension 86'. Pawl 86 is thereby swung out against the action of the pressure spring 88 so that the pawl shoulder 86'' is forced out of the recess 89'. Pawl 86 is thus moved into the disconnected position, so that cam disc 38 is no longer rotatably connected with main shaft 37.

In the said movement of rod 95 to the left with respect to Fig. 2 the abutment pin 122 thereon strikes against lever 102 and swings it in the direction of the arrow shown on Fig. 2. In this manner rod 107 is moved to the left with respect to Fig. 10, contact 111, 112 is closed and lug 120 released from disc 119. Main shaft 37 now describes a complete revolution for the fourth time during which, however, cam disc 38 is inoperative, so that the gear mountings 47 remain in their neutral position, thus making no transfer in the totalizer.

On the other hand, by connecting in the clutch 77, 81' (Fig. 2) gear 78 has been coupled with gear 81. Gear 81 is constantly connected with main shaft 37 through gear 80 and shaft 53', so that while the main shaft describes its fourth revolution, gear 81 and therewith gear 78 make a revolution. This rotation is transmitted through gear 82 to gear 83 (Fig. 14) which has twice as many teeth as gear 78 and as a result describes a half rotation in the direction of the arrow on Fig. 14 during the fourth revolution of the main shaft. Pins 84 thereby cooperate with recesses 85' of the carriage shift plate 85 and move the carriage one position to the left with respect to Fig. 14. As Fig. 14 is a rear elevation this movement to the left therein means a movement to the right in Fig. 1 of carriage 2 for one decimal position. The value "72" in totalizer 4 is thus disposed with respect to the set up multiplicand so that the "7" of the value "72" is over the "4" of the multiplicand "24".

During the rotation of the main shaft 37 in the direction of the arrow on Fig. 2 the roller 214, which is journalled on a disc attached to the main shaft 37, contacts with the extension 213' of bar 213 and draws the bar 213 into the position shown in Fig. 2, with expansion of spring 217. The pawl shoulder 206' (Fig. 16) thereby snaps into the recess 211' of slide 211 and locks the slide 211 and bar 213 in their initial position. Since roller 214 enters into operation during the first half rotation of shaft 37, lever 271 and the rod mechanism 66, 90—100 preliminarily actuated thereby again return to the initial position shown on Fig. 2, so that at the end of the fourth rotation of the main shaft the electric contact 111, 112 (Fig. 10) is interrupted and lug 120 passes into operative position. After the carriage is shifted in the manner described, the machine is at a standstill.

Thereupon the next highest decade of the multiplier, that is the "7" is set up. For this purpose it is necessary to depress the "7" key of the multiplier setting keys 123, whereby, as shown in Fig. 5, the lever 132 pivoted to said key cooperates with slide 148k and forces it into its end position shown in Fig. 5.

The extension 148' (Fig. 9) provided on slide 148k therefore passes through the corresponding guide slot of recess 154k (Fig. 5), while the corresponding extension 148" (Fig. 9) contacts with bar 170 and carries it from the initial position into the position shown in Fig. 5.

With bar 170, the downwardly directed extension 179 provided thereon is also moved downwardly. The lower end of extension 179 thereby comes in contact with plate 242 of lever 239 and rocks it into the position shown in Fig. 5. Thereby, exactly as in the preceding set-up of the "3", lever 244 swings pawl 246 downwardly, so that bar 151 is released for the traction of spring 168 engaged therewith. The bar is thereby moved by the spring to the left, with respect to Fig. 5, to such extent that the corresponding edge of extension 148' contacts with the right limiting edge of recess 154k. As stated, the result thereof is, that ratchet wheel 158 will rotate for three tooth subdivisions in the direction opposite to that of the arrow in Fig. 5.

While lever 239 has been moved by extension 179 into the position shown in Fig. 5, the roller 182 journalled on the extension 179 has contacted the cam surface 183' of lever 183 and has rocked it clockwise from the position shown in Fig. 5a into that shown in Fig. 5. By this rocking of lever 183, the lever 184 (Fig. 15) is also rocked, so that it takes the position shown in dotted lines in Fig. 15. During the rocking of lever 184, however, plate 186 has been moved therewith to the right, so that pin 186' on plate 186 is moved in the bifurcated end 187' of lever 187. Together with plate 186 the rod 21 is simultaneously moved by means of the link 194 in the direction of the arrow in Fig. 15, and to such extent that rod 21 passes to its other end position, in which levers 27 and 29 rock the lever 32.

At the same time, of course, levers 16, 18 have been rocked by means of rod 21 clockwise (see Figs. 11 and 15). Levers 16, 18 thus assume a position which is the same as produced by pressing the minus key 9. Through this rocking of levers 27, 29 lever 32 is at the same time rocked so that its shoulder 32" lies in front of the pin 39" of plate 39 (Fig. 5).

When lever 239 (Fig. 5) is rocked by depressing a corresponding key, the edge of plate 242 comes into the recess 255' of lever 255. If, now, the said key is released, so that it can return to the initial position through the action of spring 130, slide 148k can also again move upwardly somewhat through the action of spring 149, and to such extent until the extension 148' (Fig. 9) contacts with the under surface of the upper or central part of the U-shaped bar 151. The result of this is, that the extension 179 can move upwardly for a corresponding extent.

This releases lever 239 so that it may swing to the intermediate position and close the circuit of the motor as previously explained.

During the following first revolution of the main shaft the cam member 38 (Fig. 2) is rotated as pawl 86 is again in the coupling position. Plate 34 (Fig. 6a) is thus swung out by the cam member 38. Plate 39 is thereby rocked in the direction of the arrow on Fig. 5 by means of shoulder 32", which contacts with pin 39", so that gears 49 mesh with gears 61. This, however, means that the number wheels 63 of the totalizer are rotated subtractively. Corresponding to the multiplicand "24," the value "....99 832" will appear in the totalizer after the first rotation of the main shaft. Simultaneously, as in the set-up of the first decimal position during the first rotation of the main shaft, ratchet wheel 158 has been turned back for a tooth in the direction of the arrow on Fig. 5.

It is to be noted that in said rocking of plate 39 in the direction of the arrow in Fig. 5, pin 39" cooperates with the recess 137" of lever 137 and moves the latter to the right from the position shown in Fig. 5. In such case the bar 134 is also moved to its right end position. The projection 139 on bar 134 therefore releases lever 140, so that the red color field of lever 140 will come in front of window 145. Simultaneously with the movement of bar 134 the levers 132 connected therewith have also been rocked into the position shown in Fig. 4 with respect to slides 148a—148m.

As rod 227, at the end of the first rotation of the main shaft, is still in the position shown in dotted lines on Fig. 16, main shaft 37 at once passes into its second revolution, at the end of which the value "....99 592" appears in the totalizer. During this second revolution of the main shaft, ratchet wheel 158 has again been shifted back for a tooth in the direction of the arrow on Fig. 5. As ratchet wheel 158 is still not in its initial position at the end of the second revolution of the main shaft, rod 227 being still in the position shown in dotted lines on Fig. 16, the main shaft passes into its third revolution. At the end of this third revolution the value "... . 99 352" appears in the totalizer.

During the third revolution of the main shaft the ratchet wheel 158 is swung into its initial position by means of the shift tooth 159'. On contact of pin 233 with projection 232 of rocker plate 165, rod 227 is again drawn back to the initial position of Fig. 16 and lever 229 is moved to the position shown in full lines in Fig. 16. At the same time, however, angle lever 221 is rocked on the return of rod 227 by the pin 226 and pawl 206 is withdrawn from recess 211'.

Slide 211 and bar 213 can thus, through the traction of their engaging spring 217, snap into the position shown in dotted lines in Fig. 16. Pin 216 therefore contacts with lever 271 and will swing it counterclockwise from the position in Fig. 2. Through the rocking of lever 271, the precedingly described carriage shift is advanced a further step. After the carriage shift is terminated, the "3" of the temporary partial result comes into position over the "4" of the multiplicand "24" set up in the key board.

The highest decimal position of the multiplier "373" is then set up by pressing the key 123 designated "3". Since, as a result of shifting bar 134 (Fig. 4) the corresponding lever 132 takes a position above slide 148e, this slide (Fig. 8) is depressed. As the recess 154e coordinated with slide 148e is somewhat larger than the previous operative recess 154d, in the resultant release of bar 151 it will go somewhat further to the left than in the case of Fig. 7. This indicates, however, that the ratchet wheel 158 will move for four teeth in the direction of the arrow in Fig. 8.

Simultaneously with the depression of slide 148e the extension 148" (Fig. 9) also provided thereon contacts with bar 169 and moves it into the position shown in Fig. 7. The extension 173 is depressed and in the manner previously described shoulder 32' is brought opposite pin 39' and main shaft 37 is actuated.

Main shaft 37 is now set in operation (Fig. 6a) and, first, by means of the cam member 38, plate 34 is rocked, in the direction of the arrow in Fig. 6a. Lever 32 is thereby moved in the direction of the arrow on Fig. 6a. As shoulder 32' of lever 32 lies in front of pin 39' of plate 39 the latter is rocked clockwise, so that gears 48 mesh with gears 61. This designates, however, that the coordinated number wheels 63 are rotated positively, that is, additively. Corresponding to the set up multiplicand "24", which takes the hundreds position with respect to the totalizer, the transfer thus takes place during the first rotation of the main shaft, so that at the end thereof the value "1 752" appears in the totalizer.

Inasmuch as at each revolution of the main shaft the ratchet wheel 158 is shifted back for a tooth, the main shaft describes three more rotations before wheel 158 is shifted back to its initial position and rod 227 (Fig. 16) also assumes its initial position. At the end of the second revolution of the main shaft the value "4 152" appears in the totalizer, at the end of the third rotation the value "6 552" and at the end of the fourth final result "8 952".

It is obvious that as a result of the release of slide 211 and bar 213 taking place during the fourth revolution, the carriage is further shifted before the machine is brought to a final standstill. This, however, is immaterial for the result attained.

In the preceding exemplary calculation the highest decimal position (the hundreds position) has a "3" which is calculated additively. If, however, a number greater than "4" is involved in the highest decimal position, and therefore the last one to be calculated, then, in the exemplary calculation described, in which the numbers above "4" (namely "5"–"9") were carried subtractively into the calculating mechanism, after the multiplier is set up by pressing the keys 123, bar 134 will be in the position shown on Fig. 4. This, however, brings the red field 143 into view and this indicates that the calculation is not yet final. The multiplicand in such case must again be introduced into the calculation, and for a decimal position higher, thus forming the highest decimal position of the multiplier.

For example, if the multiplier "82" is involved the highest decimal position is the tens position. In such case, the multiplicand would have to be introduced again in the hundreds position into the calculation. Inasmuch as, in the present calculating machine, each time ratchet wheel 158 is returned to the initial position, the carriage is shifted, the operator need not give any attention to the operation of the machine.

The position of bar 134 is indicated to the operator by the red field appearing in window 145. If this red field appears in window 145 after the multiplier has been successively set up the operator must then press the key designated by "0". Inasmuch as, in said position of bar 134 (Fig. 4) the lever 132 coordinated with the "0" key 123 is over the slide 148b, on releasing bar 151 the corresponding projection 148' of slide 148b comes in contact with recess 154b (Fig. 8). In such case, when bar 151 is released ratchet wheel 158 will move from the initial position for a tooth in the direction of the arrow shown in Fig. 8.

In this case, the main shaft would thus describe a rotation, while the ratchet wheel 158 is again shifted back to the initial position. During this rotation of the main shaft the multiplicand would be carried into the corresponding decimal position in the totalizer. As the key 123 designated by "0" has acted on rod 169 through the corresponding slide 148b, roller 176 has contacted with lever 177 (Fig. 7) which has then moved rod 21 (Fig. 6), so that the shoulder 32' comes in front of pin 39', so that gears 48 mesh with gears 61 and the number wheels 63 are additively operated. However, inasmuch as plate 39 has been rocked clockwise the plate 137 hooked with pin 39" (Fig. 4) is moved to the left, so that at the end of the corresponding rotation of the main shaft the black field appears in window 145, which tells the operator that the calculation is terminated.

Some details of the new apparatus which do not appear in the exemplary calculation are now explained.

The key 123 designated by "0", like all the other keys, has coordinated therewith two slides, those designated by 148a and 148b (Fig. 8). Whether slide 148a or 148b is actuated by pressing the "0" key depends on whether slide 134 is in the position shown in Fig. 5, in which the black field appears in the window 145, or whether slide 134 is in the position of Fig. 4, in which the red field appears in window 145.

These two positions, in turn, of slide 134 depend on whether the "0" is the lowest decimal position of the multiplier (as calculation can be begun only when the black field appears in window 145), or whether the decimal position at the right of the "0" is a number under "5" (a number from "0" to "4" has been previously pressed), or whether the decimal position at the right of the "0" is a number over "4" (a number "5"–"9" has previously been pressed).

For example, if a "6" has previously been pressed, bar 134 is then moved into the position shown on Fig. 4, the red field appearing in window 145. If, thereupon, the key 123 designated "0" is pressed, slide 148b is moved downwardly, which results in moving the bar 151 with a rotation of ratchet wheel 158 for a tooth subdivision. The multiplicand is thus transferred once into the totalizer.

On the other hand, if a "0" or a "1" or a "2" or a "3" or a "4" have previously been pressed, as, for instance, if the set up of the multiplier began with "0" because the tens position of the multiplier is a "0", slide 134 is in the position shown on Fig. 5, in which the black color appears in window 145. In this case the lever 132 provided on the key 123 designated "0" contacts with the slide 148a (Fig. 7).

Since slide 148a has no shoulder 148" (Fig. 9), such as all the other slides with the exception of 148g have, neither the rod 169 nor 170 are actuated on depressing these slides. Lever 239 therefore is not actuated. As a result stop lever 246 also is not moved out of its locking position and the bar 151, as well as ratchet wheel 158, will remain in their initial position.

On depressing slide 148a, however, the shoulder 195 (Fig. 7) provided thereon strikes against bar 196 and depresses it by correspondingly rocking it on links 197. Shoulder 203' of lever 203 which engages over the pin 207 on pawl 206 (Fig. 16), thereby draws pawl 206 downwardly, so that it is withdrawn from the recess 211' of slide 211. Slide 211 and bar 213 connected therewith are released for the traction of spring 217, and the bars pass into the position shown in dotted lines on Fig. 16. Pin 216 contacts lever 271 (Fig. 2), which initiates the previously explained slide shift. During the following revolution of the main shaft the roller 214 on disc 215 again returns the slide 211 and bar 213 to the initial position, as described in the foregoing.

It is to be noted that when slide 211 and bar 213 move to the right, with respect to Fig. 16, the pin 281 traversing the frame wall through a corresponding slot 280 (Fig. 6) rocks lever 203 to the left, with respect to Fig. 3, so that the hook-like projection 203' lies outside the range of pin 207. Only after slide 211 and bar 213 again return to their initial positions, does pin 281 permit lever 203 to again pass into position ready for operation, according to Fig. 3.

Thus, if slide 134 is in the position of Fig. 5 the carriage 2 is shifted to the right only by pressing the key 123 designated by "0". The same is the case on pressing the key designated by "9", but only when the decimal order at the right thereof was a "5", "6", "7", "8", or a "9", thus negatively, that is, subtractively, calculated. In this case the lever 132 pivoted to the key 123 designated "9" contacts with slide 148g (Fig. 9), which carries the projection 200. This latter extends into the movement path of rod 196, so that the carriage 2 is advanced for one step only.

A spring notch is coordinated with bar 134 in order to prevent it from being moved from its set end position by impact, shock, vibration or the like. This spring notch consists of a spring attached to an extension 283 (Fig. 8) of frame wall 129, the ends of said spring contacting with two notch-like recesses 284' of a plate 284 provided on bar 134.

If the product of the multiplicand set up in the key board and the multiplier to be set up by the keys 123 is to be subtracted from a number set up in the totalizer, it is necessary only to move the lever 187 provided with the handle 189 from the position of Fig. 15 to that of Fig. 15a. With this rocking of lever 187 plate 186 is rocked so that pin 192 lies in recess 186". Thereby the movement of lever 184, which is connected with levers 177, and 183, is transmitted reversely with respect to plate 190 (Fig. 6a). If, lever 184 is in its left end position, which corresponds to the position of plate 186 according to Fig. 15 and to a set-up of rods 21—32, as on Fig. 6a, then, in reversing plate 186 according to Fig. 15a, rods 21—32, as a result of the different position of plate 190, would take the subtractive position. This signifies, however, that rod 173 and roller 176, which in the ordinary actuation cause gears 48 and the number wheels 63 to be rotated in the positive, that is, additive, direction, will after the reversal according to Fig. 15a, cause the gears 49 to operate for subtractive calculation.

The same thing takes place reversely when rod 170 is actuated. In this case, when lever 184 is rocked in the direction of the arrow on Fig. 15a, the rod 21 is moved not to the right, but to the left, so that the parts 21—32 will assume the position shown in Fig. 6a. This, however, signifies that in pressing one of the keys "5"–"9", gears 48, and not gears 49, come into mesh with the number wheels 63 which are rotated therefore positively, that is additively.

In order not to transmit this reversed movement of rods 21—32 also to bar 134, lever 187 is reversed at the same time as plate 186. This is done by means of the rod 262 which, in the rocking of lever 187, is moved into the position, to the left, with respect to Fig. 6. Pin 264 thereby depresses the free end of lever 267, so that the latter is rocked counter-clockwise in Fig. 6. As the pin 268 in lever 267 engages under lever 137 the latter is rocked upwardly, so that the recess 137" is disengaged from pin 39", while pin 39' comes into recess 137'. Although, for example, on pressing one of the keys "5" to "9", plate 39 is rocked, so that number wheels 63 are positively actuated, slide 134 is set so that it assumes the position shown on Fig. 4, in which the red color appears in window 145. Reversely, of course, on pressing one of the keys "0" to "4", although plate 39 is rocked so that the number wheels 63 are rotated subtractively, slide 134 is set so that it takes the position of Fig. 5, wherein the black field appears in window 145.

It is particularly to be noted that in the exemplary embodiment shown the arrangement is such that a succeeding operation can be begun only after the return of the key 123 which was depressed to initiate the last operation. This arrangement is important because thereby the said reversing movements do not depend on the rapidity with which the keys are depressed. In the new arrangement the keys may thus be depressed by impact without danger of error in the set-up.

I claim:

1. A calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a plurality of control elements to control said multiplication control means, a series of members, each operable by one of said series of keys and each selectively cooperating with a plurality of said control elements, and means for setting said members in either of two positions; certain of said control elements controlling said control means to cause said actuating mechanism to register in said totalizer a multiplicand set up in said keyboard as many times as the key value of the multiplier key depressed, while others of said control elements control said control means to cause said actuating mechanism to register in said totalizer the multiplicand set up in said keyboard a number of times which is greater by one than the key value of the multiplier key depressed.

2. A calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a plurality of control elements to control said multiplication control means, a series of members, each operable by one of said series of keys and each selectively cooperating with a plurality of said control elements, and means for setting said members in either of two positions; whereby depression of a multiplier key operates one of said control elements to cause same to control said control means to cause said actuating mechanism to register in said totalizer a multiplicand set up in said keyboard as many times as the key value of the multiplier key depressed when said setting means is in one position thereof, and whereby depression of a multiplier key operates one of said control elements to cause same to control said control means to cause said actuating mechanism to register in said totalizer the multiplicand set up in said keyboard a number of times which is greater by one than the key value of the multiplier key depressed when said setting means is in the second position thereof.

3. A calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a plurality of control elements to control said multiplication control means, a series of members, each operable by one of said series of keys and each selectively cooperating with a plurality of said control elements, means for setting said members in either of two positions, and means operated by said multiplication control means during one multiplying operation for positioning said setting means to cause each multiplier key to coact with one or another of the plurality of control elements cooperating with the key operable member on the next succeeding depression of a multiplier key; certain of said control elements controlling said control means to cause said actuating mechanism to register in said totalizer a multiplicand set up in said keyboard as many times as the key value of the multiplier key depressed, while others of said control elements control said control means to cause said actuating mechanism to register in said totalizer the multiplicand set up in said keyboard a number of times which is greater by one than the key value of the multiplier key depressed.

4. A motor driven calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a set of control elements cooperating with said keys to control said multiplication control means to cause said actuating mechanism to register in said totalizer a multiplicand set up in said keyboard as many times as the key value of the multiplier key depressed, a second set of control elements cooperating with said keys to control said multiplication control means to cause said actuating mechanism to register in said totalizer the multiplicand set up in said keyboard a number of times which is greater by one than the key value of the multiplier key depressed and means controlled by said multiplication control means determining which set of said control elements will cooperate with the multiplier key depressed in the next succeeding operation.

5. A motor driven calculating machine comprising a keyboard in which a multiplicand value may be set, an algebraic totalizer, reversible cyclically operable actuating mechanism therefore settable by said keyboard, multiplication control means controlling the number of cycles of operation of said actuating mechanism and controlling additive and subtractive operation of said actuating mechanism, a series of multiplier keys each corresponding to a multiplier value, a set of control elements cooperating with said keys to control said multiplication control means to cause said actuating mechanism to register in said totalizer a multiplicand set up in said keyboard as many times as the key value of the multiplier key depressed, a second set of control elements cooperating with said keys to control said multiplication control means to cause said actuating mechanism to register in said totalizer the multiplicand set up in said keyboard a number of times which is greater by one than the key value of the multiplier key depressed and means operative when said multiplication control means controls subtractive operation of said actuating mechanism for placing said second set of control elements in position to cooperate with said multiplier keys in the next succeeding operation.

6. A calculating machine comprising a keyboard in which a multiplicand value may be set, an algebraic totalizer, reversible cyclically operable actuating mechanism therefore settable by said keyboard, multiplication control means controlling the number of cycles of operation of said actuating mechanism and controlling additive and subtractive operation of said actuating mechanism, a series of multiplier keys having the multiplier values "0" to "9", said multiplier keys having the values "0" to "4" inclusive upon depression thereof initiating and controlling additive operation of said actuating mechanism under the control of said multiplication control means and said multiplier keys having the values "5" to "9" inclusive upon depression thereof initiating and controlling subtractive operation of said actuating mechanism under the control of said multiplication control means and means for controlling said multiplication control means to cause said actuating mechanism to register in said totalizer during the next succeeding operation after a multiplier key having the values "5" to "9" has been depressed, a multiplicand set up in said keyboard a number of times which is greater by one than the key value of the multiplier key depressed if a multiplier key having a value "0" to "4" be depressed and a number of times which is one less than the tens complement of the key value if a multiplier key having a value "5" to "9" be depressed.

7. A calculating machine comprising a keyboard in which a multiplicand value may be set, an algebraic totalizer, reversible cyclically operable actuating mechanism therefore settable by said keyboard, multiplication control means controlling the number of cycles of operation of said actuating mechanism and controlling additive and subtractive operation of said actuating mechanism, a series of multiplier keys having the multiplier values "0" to "9", said multiplier keys having the values "0" to "4" inclusive upon depression thereof initiating and controlling additive operation of said actuating mechanism under the control of said multiplication control means and said multiplier keys having the values "5" to "9" inclusive upon depression thereof initiating and controlling subtractive operation of said actuating mechanism under the control of said multiplication control means, a set of control elements to control said multiplication control means to cause said actuating mechanism to register in said totalizer a multiplicand set up in said keyboard as many times as the key value of the multiplier key depressed if a key having the value "0" to "4" be depressed and a number of times which is the tens complement of the key value if a multiplier key having the value "5" to "9" be depressed, a second set of control members to control said control means to cause said actuating mechanism to register in said totalizer the multiplicand set up in said keyboard a number of times which is greater by one than the key value of the multiplier key depressed if a multiplier key having a value "0" to "4" be depressed and a number of times which is one less than the tens complement of the key value if a multiplier key having a value "5" to "9" be depressed and means placing said first set of control elements or said second set of control elements in cooperation with said multiplier keys for the next succeeding operation dependent upon whether said control means caused said actuating mechanism to operate additively or subtractively.

8. A calculating machine comprising a keyboard in which a multiplicand value may be set, an algebraic totalizer, reversible cyclically operable actuating mechanism therefore settable by said keyboard, multiplication control means controlling the number of cycles of operation of said actuating mechanism and controlling additive and subtractive operation of said actuating mechanism, a series of multiplier keys having the multiplier values "0" to "9", said multiplier keys having the values "0" to "4" inclusive upon depression thereof initiating and controlling additive operation of said actuating mechanism under the control of said multiplication control means and said multiplier keys having the values "5" to "9" inclusive upon depression thereof initiating and controlling subtractive operation of said actuating mechanism under the control of said multiplication control means, a set of control elements to control said multiplication control means to cause said actuating mechanism to register in said totalizer the multiplicand set up in said keyboard as many times as the value of the multiplier key depressed if a key having the value "0" to "4" be depressed and a number of times which is the tens complement of the key value if a multiplier key having the value "5" to "9" be depressed in the next succeeding operation after an operation initiated by one of said keys having the values "0" to "4" and a second set of control elements to control said multiplication control means to cause said actuating mechanism to register in said totalizer the multiplicand set up in said keyboard a number of times which is greater by one than the key value of the multiplier key depressed if a multiplier key having a value "0" to "4" be depressed and a number of times which is one less than the tens complement of the key value if a multiplier key having a value "5" to "9" be depressed, in the next succeeding operation following an operation initiated by one of said keys having the values "5" to "9".

9. A calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a plurality of control elements to control said multiplication control means, a series of members, one pivoted to each of said keys and operable thereby and each selectively cooperating with a plurality of said control elements, and means for setting said members in either of two positions; certain of said control elements controlling said control means to cause said actuating mechanism to register in said totalizer a multiplicand set up in said keyboard as many times as the key value of the multiplier key depressed, while others of said control elements control said control means to cause said actuating mechanism to register in said totalizer the multiplicand set up in said keyboard a number of times which is greater by one than the key value of the multiplier key depressed.

10. A calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a first set of control elements to control said multiplication control means to cause said actuating mechanism to register in said totalizer a multiplicand set up in said keyboard as many times as the key value of the multiplier key depressed if a key having the value "0" to "4" be depressed and a number of times which is the tens complement of the key value if a multiplier key having the value "5" to "9" be depressed, a second set of control elements controlling said control means to cause said actuating mechanism to register in said totalizer the multiplicand set up in said keyboard a number of times which is greater by one than the key value of the multiplier key depressed if a multiplier key having a value "0" to "4" be depressed and a number of times which is one less than the tens complement of the key value if a multiplier key having a value "5" to "9" be depressed, a plurality of members, one pivoted to each of said keys and means for pivoting said members so as to operatively associate said members either with said first set of control elements or with said second set of control elements.

11. A calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a first set of control elements to control said multiplication control means to cause said actuating mechanism to register in said totalizer a multiplicand set up in said keyboard as many times as the key value of the multiplier key depressed if a key having the value "0" to "4" be depressed and a number of times which is the tens complement of the key value if a multiplier key having the value "5" to "9" be depressed, a second set of control elements controlling said control means to cause said actuating mechanism to register in said totalizer the multiplicand set up in said keyboard a number of times which is greater by one than the key value of the multiplier key depressed if a multiplier key having a value "0" to "4" be depressed and a number of times which is one less than the tens complement of the key value if a multiplier key having a value "5" to "9" be depressed, a plurality of members, one pivoted to each of said keys and means operative during one operation for pivoting said members so as to operatively associate said members either with said first set of control elements or with said second set of control elements so that said members will coact with one or the other of said sets of control elements in the next succeeding operation.

12. A calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a first set of control elements to control said multiplication control means to cause said actuating mechanism to register in said totalizer a multiplicand set up in said keyboard as many times as the key value of the multiplier key depressed if a key having the value "0" to "4" be depressed and a number of times which is the tens complement of the key value if a multiplier key having the value "5" to "9" be depressed, a second set of control elements controlling said control means to cause said actuating mechanism to register in said totalizer the multiplicand set up in said keyboard a number of times which is greater by one than the key value of the multiplier key depressed if a multiplier key having the value "0" to "4" be depressed and a number of times which is one less than the tens complement of the key value if a multiplier key having a value "5" to "9" be depressed, a plurality of members, one pivoted to each of said keys, a slide pivotally connected to all of said members and means for moving said slide to pivot said members to operatively associate said members with either said first or second set of control elements.

13. A calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a first set of control elements to control said multiplication control means to cause said actuating mechanism to register in said totalizer a multiplicand set up in said keyboard as many times as the key value of the multiplier key depressed if a key having the value "0" to "4" be depressed and a number of times which is the tens complement of the key value if a multiplier key having the value "5" to "9" be depressed, a second set of control elements controlling said control means to cause said actuating mechanism to register in said totalizer the multiplicand set up in said keyboard a number of times which is greater by one than the key value of the multiplier key depressed if a multiplier key having a value "0" to "4" be depressed and a number of times which is one less than the tens complement of the key value if a multiplier key having a value "5" to "9" be depressed, a plurality of members, one pivoted to each of said keys, a slide pivotally connected to all of said members and means controlled by said multiplication control means for moving said slide to pivot said members in order to operatively associate said members with either said first or said second set of control elements.

14. A calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a first set of control elements to control said multiplication control means to cause said actuating mechanism to register in said totalizer a multiplicand set up in said keyboard as many times as the key value of the multiplier key depressed if a key having the value "0" to "4" be depressed and a number of times which is the tens complement of the key value if a multiplier key having the value "5" to "9" be depressed, a second set of control elements controlling said control means to cause said actuating mechanism to register in said totalizer the multiplicand set up in said keyboard a number of times which is greater by one than the key value of the multiplier key depressed if a multiplier key having a value "0" to "4" be depressed and a number of times which is one less than the tens complement of the key value if a multiplier key having a value "5" to "9" be depressed, a plurality of members, one pivoted to each of said keys a slide pivotally connected to all of said members, means controlled by said multiplication control means for moving said slide to pivot said members in order to operatively associate said members with either said first or said second set of control elements and visible signalling means operated by said slide indicating which set of control elements is positioned for cooperation with said pivoted members.

15. A calculating machine comprising a keyboard in which a multiplicand value may be set, an algebraic totalizer, reversible cyclically operable actuating mechanism therefore settable by said keyboard, multiplication control means controlling the number of cycles of operation of said actuating mechanism and controlling additive and subtractive operation of said actuating mechanism, a series of multiplier keys having the multiplier values "0" to "9", said multiplier keys having the values "0" to "4" inclusive upon depression thereof initiating and controlling additive operation of said actuating mechanism under the control of said multiplication control means and said multiplier keys having the values "5" to "9" inclusive upon depression thereof initiating and controlling subtractive operation of said actuating mechanism under the control of said multiplication control means, a set of control elements to control said multiplication control means to cause said actuating mechanism to register in said totalizer a multiplicand set up in said keyboard as many times as the key value of the multiplier key depressed if a key having the value "0" to "4" be depressed and a number of times which is the tens complement of the key value if a multiplier key having the value "5" to "9" be depressed, a second set of control members to control said control means to cause said actuating mechanism to register in said totalizer the multiplicand set up in said keyboard a number of times which is greater by one than the key value of the multiplier key depressed if a multiplier key having a value "0" to "4" be depressed and a number of times which is one less than the tens complement of the key value if a multiplier key having a value "5" to "9" be depressed, a pivoted member upon each multiplier key for operating said control elements and means controlled by said multiplication control means upon additive operation of said actuating mechanism for operatively associating said first mentioned set of control elements with said pivoted members.

16. A calculating machine comprising a keyboard in which a multiplicand value may be set, an algebraic totalizer, reversible cyclically operable actuating mechanism therefore settable by said keyboard, multiplication control means controlling the number of cycles of operation of said actuating mechanism and controlling additive and subtractive operation of said actuating mechanism, a series of multiplier keys having the multiplier values "0" to "9", said multiplier keys having the values "0" to "4" inclusive upon depression thereof initiating and controlling additive operation of said actuating mechanism under the control of said multiplication control means and said multiplier keys having the values "5" to "9" inclusive upon depression thereof initiating and controlling subtractive operation of said actuating mechanism under the control of said multiplication control means, a set of control elements to control said multiplication control means to cause said actuating mechanism to register in said totalizer a multiplicand set up in said keyboard as many times as they key value of the multiplier key depressed if a key having the value "0" to "4" be depressed and a number of times which is the tens complement of the key value if a multiplier key having the value "5" to "9" be depressed, a second set of control members to control said control means to cause said actuating mechanism to register in said totalizer the multiplicand set up in said keyboard a number of times which is greater by one than the key value of the multiplier key depressed if a multiplier key having a value "0" to "4" be depressed and a number of times which is one less than the tens complement of the key value if a multiplier key having a value "5" to "9" be depressed, a pivoted member upon each multiplier key for operating said control elements and means controlled by said multiplication control means upon subtractive operation of said actuating mechanism for operatively associating said second set of control elements with said pivoted members.

17. A calculating machine comprising a keyboard in which a multiplicand value may be set, an algebraic totalizer, reversible cyclically operable actuating mechanism therefore settable by said keyboard, multiplication control means controlling the number of cycles of operation of said actuating mechanism additively and subtractively, a series of multiplier keys having the multiplier values "0" to "9", said multiplier keys having the values "0" to "4" inclusive upon depression thereof initiating and controlling additive operation of said actuating mechanism under the control of said multiplication control means and said multiplier keys having the values "5" to "9" inclusive upon depression thereof initiating and controlling subtractive operation of said actuating mechanism under the control of said multiplication control means, a set of control elements to control said multiplication control means to cause said actuating mechanism to register in said totalizer the multiplicand set up in said keyboard as many times as the value of the multiplier key depressed if a key having the value "0" to "4" be depressed and a number of times which is the tens complement of the key value if a multiplier key having the value "5" to "9" be depressed in the next succeeding operation after an operation initiated by one of said keys having the values "0" to "4", a second set of control elements to control said multiplication control means to cause said actuating mechanism to register in said totalizer the multiplicand set up in said keyboard a number of times which is greater by one than the key value of the multiplier key depressed if a multiplier key having a value "0" to "4" be depressed and a number of times which is one less than the tens complement of the key value if a multiplier key having a value "5" to "9" be depressed in the next succeeding operation following an operation initiated by one of said keys having the values "5" to "9" and means for reversing the add-subtract control exerted by said multiplication control means so that said control means will control the operation of said actuating mechanism to operate subtractively when a multiplier key having a value from "0" to "4" is depressed and to operate additively when a multiplier key having a value "5" to "9" is depressed.

18. A calculating machine comprising a keyboard in which a multiplicand value may be set, an algebraic totalizer, cyclically operable actuating mechanism therefore settable by said keyboard, multiplication control means controlling the number of cycles of operation of said actuating mechanism, a series of multiplier keys each corresponding to a multiplier value, a series of control elements operable by said keys and operable to initiate and control operation of said multiplication control means and means controlled by said multiplication control means during one operation and cooperating with said keys and said control elements to increase the number of actuating cycles initiated and controlled by said multiplier keys to one more than the key value of a multiplier key depressed in the next succeeding operation.

ULRICH EICHLER.